United States Patent
Lee et al.

(10) Patent No.: US 8,635,559 B2
(45) Date of Patent: Jan. 21, 2014

(54) ON-SCREEN CURSOR NAVIGATION DELIMITING ON A HANDHELD COMMUNICATION DEVICE

(75) Inventors: Matthew Richard Lee, Belleville (CA); Fahd Sohail Butt, Mississauga (CA); Taneem Talukdar, Kingston (CA)

(73) Assignee: BlackBerry Limited, Waterloo (CA)

( * ) Notice: Subject to any disclaimer, the term of this patent is extended or adjusted under 35 U.S.C. 154(b) by 1236 days.

(21) Appl. No.: 11/618,109

(22) Filed: Dec. 29, 2006

(65) Prior Publication Data

US 2008/0163129 A1  Jul. 3, 2008

(51) Int. Cl.
*G06F 3/048* (2013.01)

(52) U.S. Cl.
USPC ........... 715/859; 715/856; 715/860; 715/864; 345/157; 345/167

(58) Field of Classification Search
USPC ........... 715/859, 856, 860, 864; 345/157, 167
See application file for complete search history.

(56) References Cited

U.S. PATENT DOCUMENTS

| | | | |
|---|---|---|---|
| 6,741,232 B1 * | 5/2004 | Siedlikowski et al. | 345/156 |
| 6,822,664 B2 | 11/2004 | Vale | |
| 2004/0001105 A1 * | 1/2004 | Chew et al. | 345/817 |
| 2004/0155909 A1 * | 8/2004 | Wagner | 345/854 |
| 2004/0229663 A1 * | 11/2004 | Tosey et al. | 455/575.1 |
| 2006/0253801 A1 | 11/2006 | Okaro et al. | |
| 2008/0007528 A1 * | 1/2008 | Lee et al. | 345/167 |
| 2008/0007571 A1 * | 1/2008 | Lee et al. | 345/678 |

OTHER PUBLICATIONS

Canadian Office Action mailed Jun. 6, 2011. In corresponding application No. 2,572,665.
Canadian Office Action mailed Sep. 29, 2009. In corresponding application No. 2,572,665.
Notice of Allowance and Fee(s) Due mailed Oct. 31, 2012, in corresponding Canadian patent application No. 2,572,665.

* cited by examiner

*Primary Examiner* — Tadeese Hailu
*Assistant Examiner* — Darrin Hope
(74) *Attorney, Agent, or Firm* — Novak Druce Connolly Bove + Quigg LLP

(57) ABSTRACT

A handheld communication device and method for affecting movement of a highlighting cursor amongst an array of icons on a display screen is described. In an embodiment, the handheld communication device includes a lighted display, a keyboard and an auxiliary user input, e.g. a trackball, located essentially between the display and keyboard. The auxiliary user input is used to move the highlighting cursor from a first icon located on the display screen, to a second icon located on the display screen. In operation, the highlighting cursor is prevented from moving from a first row of icons to a successive second row of icons when a cross-wise directed force is applied to the auxiliary user input and the highlighted cursor has reached a terminal icon of the first row.

22 Claims, 22 Drawing Sheets

ON-SCREEN CURSOR NAVIGATION DELIMITING ON A HANDHELD COMMUNICATION DEVICE

A portion of the disclosure of this patent document contains material which is subject to copyright protection. The copyright owner has no objection to the facsimile reproduction by any one of the patent document or patent disclosure as it appears in the Patent and Trademark Office patent file or records, but otherwise reserves all copyright rights whatsoever.

FIELD

The instant disclosure is directed toward wireless handheld communication devices, and more particularly, to navigation among menu and icon items displayed on a screen of such device.

BACKGROUND

With the advent of more robust wireless communications systems, compatible handheld communication devices are becoming more prevalent, as well as advanced. In a broader sense, these devices are referred to as handheld electronic devices, which include devices without communication functions. Where in the past such handheld communication devices typically accommodated either voice (cell phones) or text transmission (pagers and PDAs), today's consumer often demands a combination device capable of performing both types of transmissions, including sending and receiving e-mail. The suppliers of such mobile communication devices and underlying service providers are anxious to meet these demands, but the combination of voice and textual messaging, as well as other functionalities such as those found in PDAs, have caused designers to have to improve the means by which information is input into the devices by the user, as well as provide better facilitation for the user to navigate within the menus and icon presentations necessary for efficient user interface with these more complicated devices.

For many reasons, screen icons are often utilized in such handheld communication devices as a way to allow users to make feature and/or function selections. Among other reasons, users are accustomed to such icon representations for function selection. A prime example is the personal computer "desktop" presented by Microsoft's Windows® operating system. Because of the penetration of such programs into the user markets, most electronics users are familiar with what has basically become a convention of icon-based functionality selections. Even with many icons presented on a personal computer's "desktop", however, user navigation and selection among the different icons is easily accomplished utilizing a conventional mouse and employing the point-and-click methodology. The absence of such a mouse from these handheld wireless communication devices, however, has caused a different protocol to develop for icon navigation and selection.

As depicted in FIGS. 2-12d, the icons displayed on the screen of the device are typically presented in an array of uniform rows and columns. As an example, a home screen might present icons for telephone, e-mail, calendar and contact functions. Because there is no "mouse," other auxiliary navigational tools are typically provided for user manipulation to affect movement between the different icons on a handheld device. Such navigational tools have included rotatable thumb wheels, joysticks, touchpads, four-way cursors and the like.

In many instances, the navigational tools require that a user scroll through the various icons and menu items displayed on the screen of the device in series or in a sequential manner. That is, in order to highlight a desired icon, or to move from one row of icons to another, a user must sequentially scroll through a number of undesired icons in order to arrive at a desired icon. This type of navigational operation is more clearly illustrated in FIGS. 2 and 3, which show a rotatable thumbwheel being used to scroll a cursor past a Memo Pad icon at the end of a first row in order to arrive at a Tasks icon on a second row. This type of navigational operation, wherein a linearly scrolled cursor is capable of being passed from a first row to a second row upon reaching a terminal end of the first row is known as "wrapping." Accordingly, in the case where the display of a device comprises a large number of icons, it can take a significant amount of time and effort for a user to scroll to a desired icon. Additionally, if commonly used icons are not conveniently located for quick and efficient access using a thumbwheel, a user can be required to repetitively scroll through a number of icons to select a commonly used function. Accordingly, user frustration is likely to occur. Further, in the case of handheld devices comprising navigational tools that are particularly sensitive to user inputs, for example, trackballs, touchpads, joysticks, etc., users can tend to "overshoot" past a desired icon during navigation. If such handheld device is configured to wrap selectable text and/or user-actuable functions, such overshooting can result in navigation to a subsequent row or rows. This, too, can result in user frustration.

Accordingly, the instantly presented solutions focus on enabling a user to navigate a cursor on a screen of a handheld electronic device having a navigational tool whose actuation is not directionally limited, e.g., trackballs, touchpads, joysticks, etc., so as to prevent and/or minimize "overshooting" of a cursor past an icon. The instantly presented solutions also focus on selectively disposing commonly used icons, menu items and the like, about the screen of a handheld electronic device such that specific movements of the navigational tool result in quick and efficient cursor navigation. The instantly presented solutions further allow a navigation tool to be used to directly navigate among icons on a menu that are vertically and/or diagonally disposed relative to the other.

BRIEF DESCRIPTION OF THE DRAWINGS

Exemplary methods and arrangements conducted and configured according to the advantageous solutions presented herein are depicted in the accompanying drawings wherein:

FIG. 17 illustrates an exemplary Dvorak keyboard layout;

FIG. 18 illustrates a QWERTY keyboard layout paired with a traditional ten-key keyboard;

FIG. 19 illustrates ten digits comprising the numerals 0-9 arranged in a telephone keypad configuration, including the * and # flanking the zero;

FIG. 20 illustrates a numeric phone key arrangement according to the ITU Standard E.161 including both numerals and letters;

DETAILED DESCRIPTION

Figure 1:
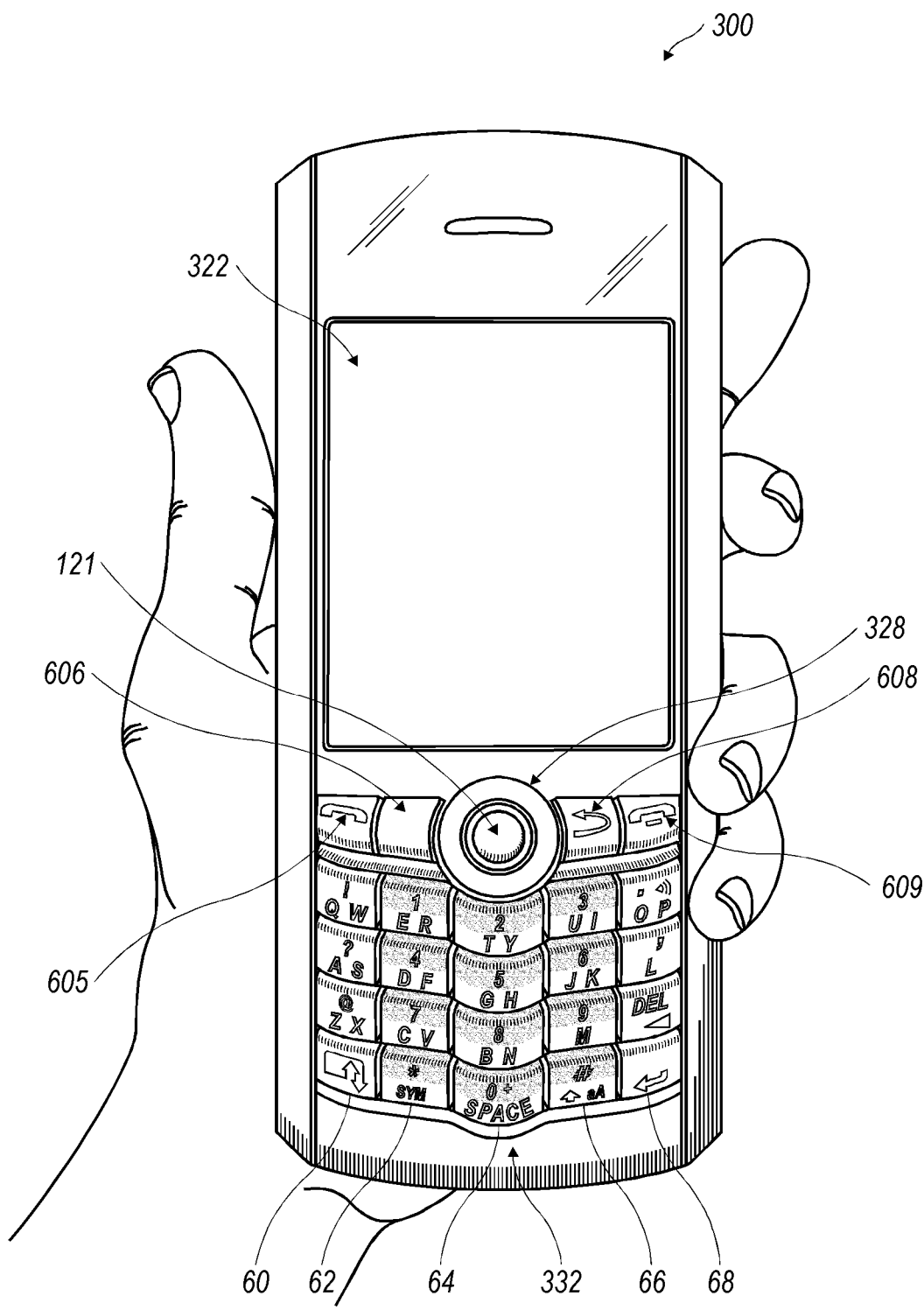
FIG. 1 depicts a handheld communication device cradled in the palm of a user's hand.

As intimated hereinabove, one of the more important aspects of the handheld electronic device to which this disclosure is directed is its size. While some users will grasp the device in both hands, it is intended that a predominance of users will cradle the device in one hand in such a manner that input and control over the device can be affected using the thumb of the same hand in which the device is held, however additional control can be effected by using both hands. As a handheld device that is desirably pocketable, the size of the device must be kept relatively small. Of the device's dimensions, limiting its width is important for the purpose of assuring cradleability in a user's hand. Moreover, it is preferred that the width of the device be maintained at less than ten centimeters (approximately four inches). Keeping the device within these dimensional limits provides a hand cradleable unit that users prefer for its useability and portability. Limitations with respect to the height (length) of the device are less stringent when considering hand-cradleability. Therefore, in order to gain greater size, the device can be advantageously configured so that its height is greater than its width, but still remain easily supported and operated in one hand.

A potential problem is presented by the small size of the device in that there is limited exterior surface area for the inclusion of user input and device output features. This is especially true for the "prime real estate" on the front face of the device, where it is most advantageous to include a display screen that outputs information to the user. The display screen is preferably located above a keyboard that is utilized for data entry into the device by the user. If the screen is provided below the keyboard, a problem occurs in that viewing the screen is inhibited when the user is inputting data using the keyboard. Therefore it is preferred that the display screen be above the input area, thereby solving the problem by assuring that the hands and fingers do not block the view of the screen during data entry periods.

To facilitate textual data entry, an alphabetic keyboard is provided. In one version, a full alphabetic keyboard is utilized in which there is one key per letter (see FIG. 22 for an example). This is preferred by some users because it can be arranged to resemble a standard keyboard with which they are most familiar. In this regard, the associated letters can be advantageously organized in QWERTY, QWERTZ, AZERTY or Dvorak layouts, among others, thereby capitalizing on certain users' familiarity with these special letter orders. In order to stay within the bounds of a limited front surface area, however, each of the keys must be commensurately small when, for example, twenty-six keys must be provided in the instance of the English language. An alternative configuration is to provide a reduced keyboard in which at least some of the keys have more than one letter associated therewith (see FIG. 23 for an example). This means that fewer keys are required which makes it possible for those fewer keys to each be larger than in the instance when a full keyboard is provided on a similarly dimensioned device. Some users will prefer the solution of the larger keys over the smaller ones, but it is necessary that software or hardware solutions be provided in order to discriminate which of the several associated letters the user intends based on a particular key actuation, a problem the full keyboard avoids. Preferably, this character discrimination is accomplished utilizing disambiguation software included on the device. To accommodate software use on the device, a memory and microprocessor are provided within the body of the handheld unit for receiving, storing, processing, and outputting data during use. Therefore, the problem of needing a textual data input means is solved by the provision of either a full or reduced alphabetic keyboard on the presently disclosed handheld electronic device. It should be further appreciated that the keyboard can be alternatively provided on a touch sensitive screen in either a reduced or full format.

Keys, typically of a push-button or touchpad nature, perform well as data entry devices but present problems to the user when they must also be used to affect navigational control over a screen-cursor. In order to solve this problem, the present handheld electronic device preferably includes an auxiliary input that acts as a cursor navigational tool and which is also exteriorly located upon the front face of the device. Its front face location is particularly advantageous because it makes the tool easily thumb-actuable like the keys of the keyboard. In a particularly useful embodiment, the navigational tool is a trackball which is easily utilized to instruct two-dimensional screen cursor movement in substantially any direction, as well as act as an actuator when the ball of the trackball is depressed like a button. The placement of the trackball is preferably above the keyboard and below the display screen; here, it avoids interference during keyboarding and does not block the user's view of the display screen during use (see FIG. 1 for an example).

In some configurations, the handheld electronic device may be standalone in that it does not connect to the "outside world." One example would be a PDA that stores such things as calendars and contact information but is not capable of synchronizing or communicating with other devices. In most situations such isolation will be viewed detrimentally in that synchronization is a highly desired characteristic of handheld devices today. Moreover, the utility of the device is significantly enhanced when connectable within a system, and particularly when connectable on a wireless basis in a network in which voice, text messaging, and other data transfer are accommodated.

Figure 2:
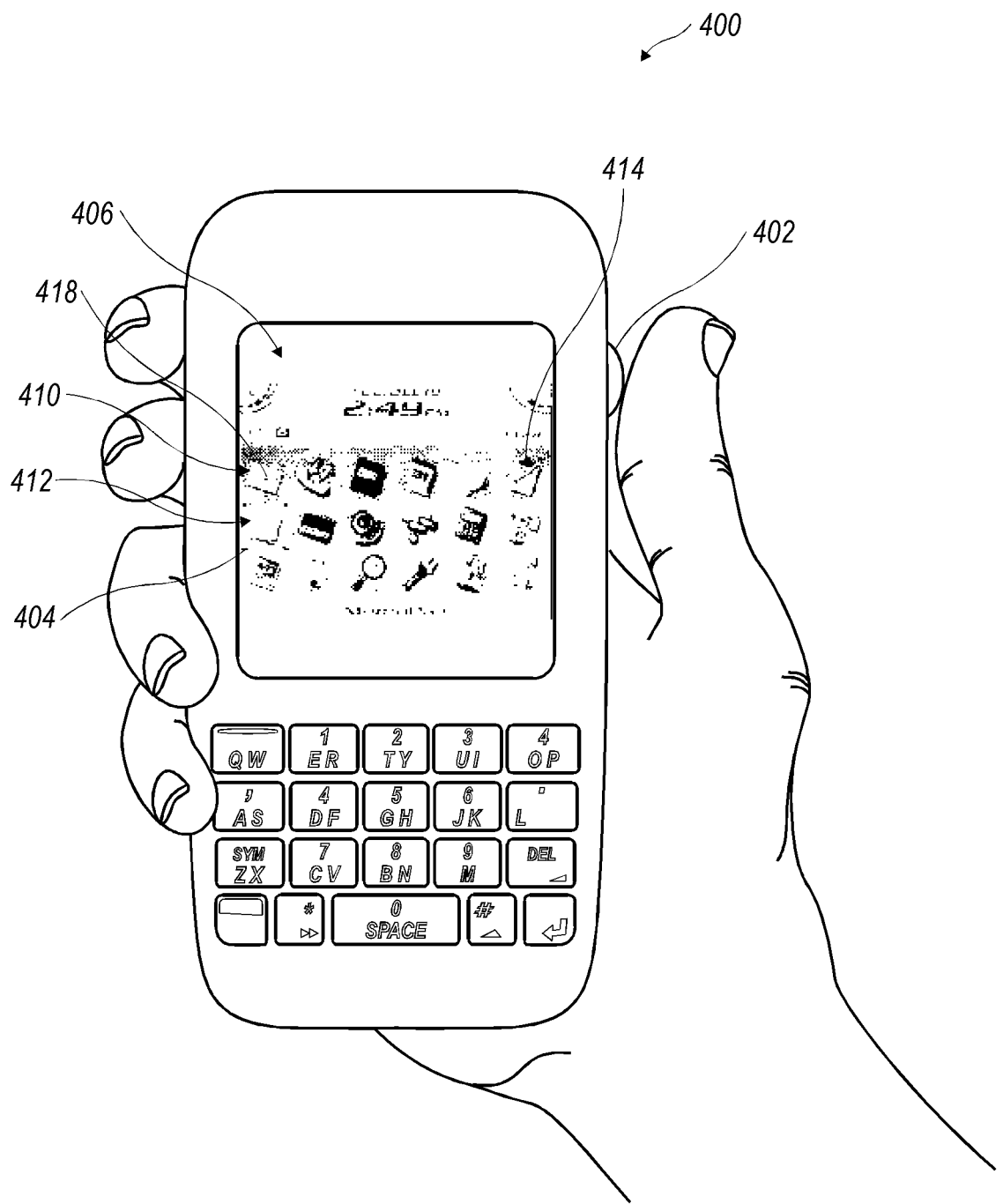
FIG. 2 depicts a known handheld communication device cradled in a user's hand and displaying an array of icons on a screen thereof, wherein a Memo Pad icon is shown as being highlighted at the rightward terminal end of a first row.
Figure 3:
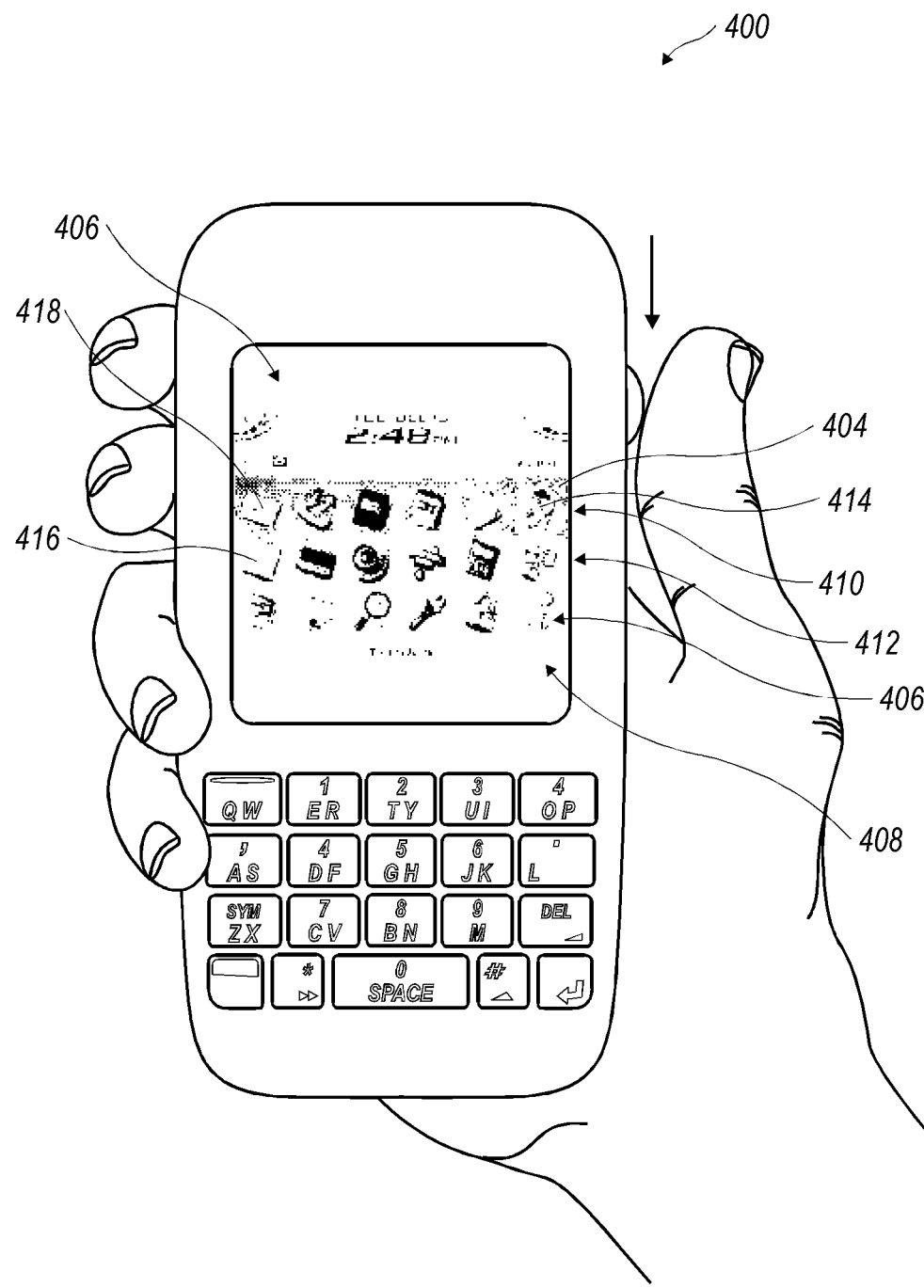
FIG. 3 depicts a known handheld communication device cradled in a user's hand and displaying an array of icons on a screen thereof, wherein a Tasks icon is shown as being highlighted at the leftward terminal end of a second row.

Referring now to FIGS. 2 and 3, as previously described, known handheld electronic device 400 is shown as broadly comprising a thumbwheel 402 for affecting movement of highlighting cursor 404 amongst a plurality of icons 408 displayed on screen 406 of the device. More specifically, movement from one icon to another occurs serially and/or sequentially to the next icon along a row of icons and is affected by rotating the thumbwheel in one of an upward or downward direction. More specifically, as shown in FIG. 3, in order to move highlighting cursor 404 from a first row 410 of icons to a second row of icons 412, the thumbwheel can be rotated in a downward direction, as shown by the arrow, such that the highlighted cursor is moved across the screen, from the left to the right side of the screen, along the first row of icons. Upon reaching rightward terminal icon 414, also labeled Memo Pad in FIG. 3, continued downward rotation of the thumbwheel causes the highlighting cursor to "wrap" to leftward terminal icon 416, also labeled Tasks in FIG. 3, of a second row of icons immediately below the first row of icons. Similar opposite movement of the highlighting cursor can be accomplished by rotating the thumbwheel in an upward direction (not shown) so as to cause the highlighting cursor to move across the screen from right to left and upwards from one row to the next.

Accordingly, from a home position, which can be the email icon 418 disposed in the upper left corner amongst the array of icons displayed, it can take significant time and effort to scroll through successive icons and/or rows to arrive at a desired icon that is to be selected. Additionally, while some devices allow users to navigate between rows without having to pass each successive icon in a row before navigating to a neighboring row, such devices require users to simultaneously depress "shift" or "alternate" keys, which ultimately requires the use of two hands.

Figure 12A:
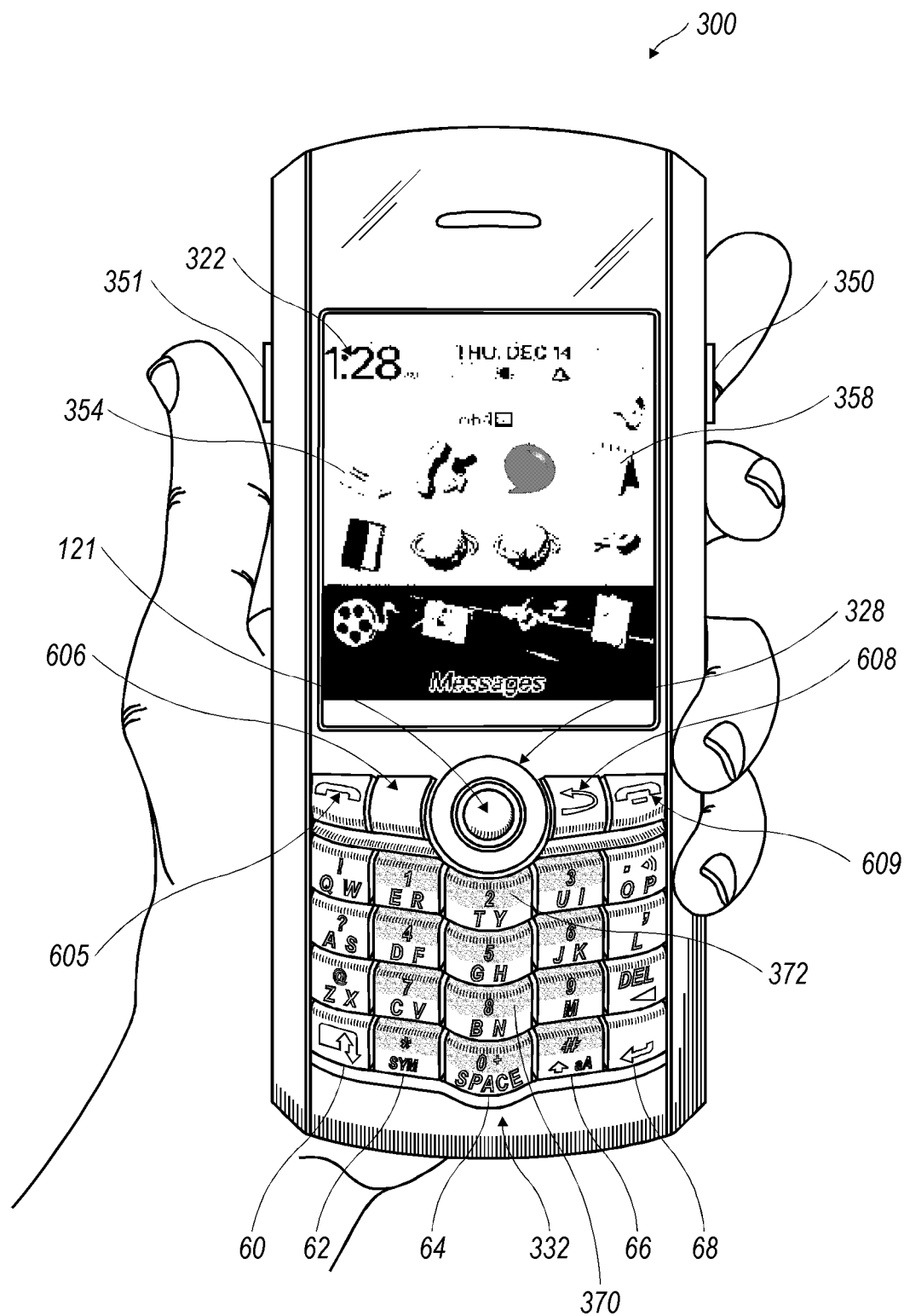
FIG. 12a depicts a novel handheld communication device cradled in a user's hand and displaying an array of icons on a screen thereof, wherein a "Messages" icon is shown as being highlighted.
Figure 12B:
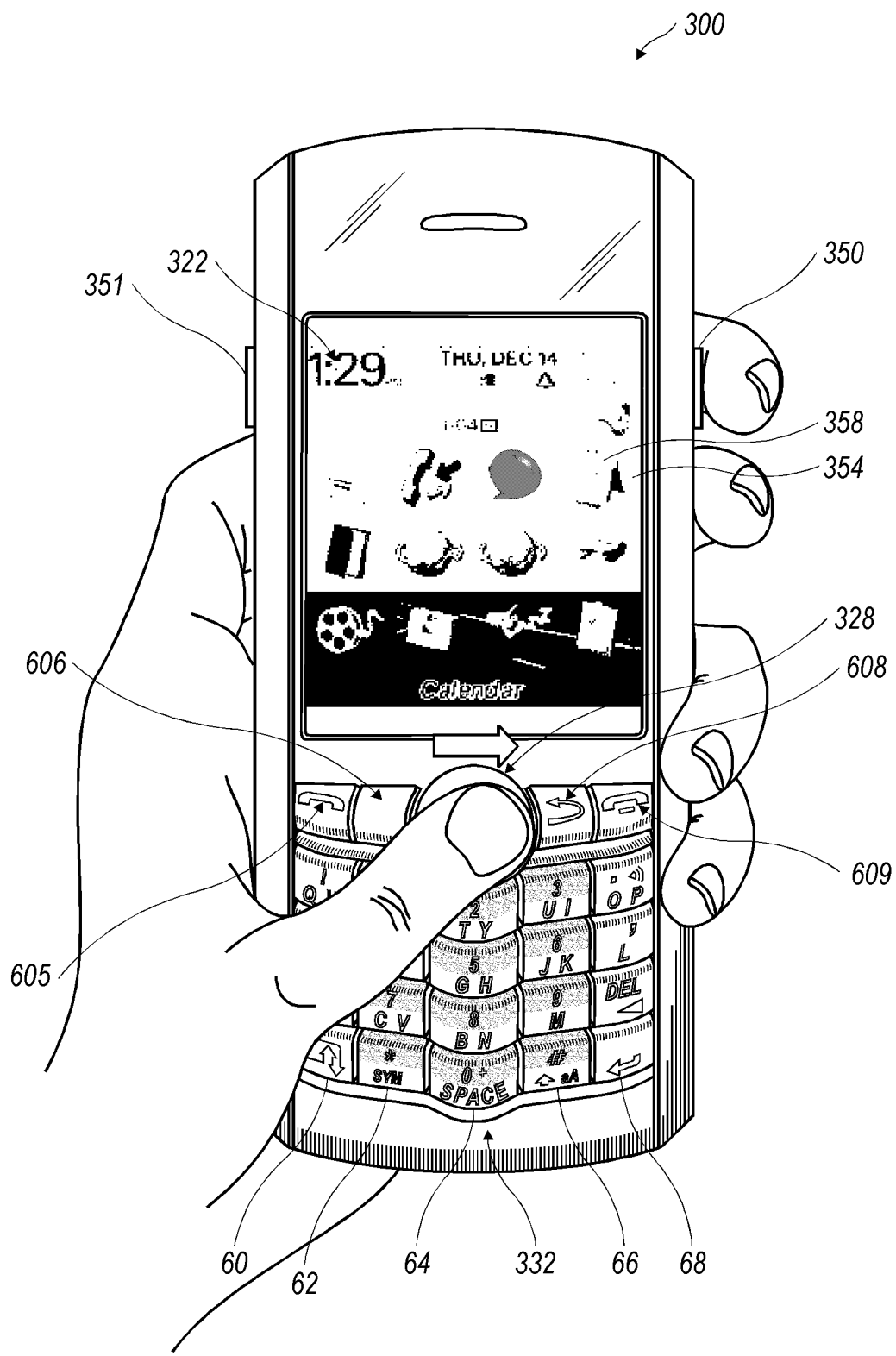
FIG. 12b depicts a novel handheld communication device cradled in a user's hand and displaying an array of icons on a screen thereof, wherein a "Calendar" icon is shown as being highlighted.

Referring now to FIGS. 1 and 4-12b, As shown in FIG. 1, the handheld device 300 is cradleable in the palm of a user's hand. The handheld device is provided with a keyboard 332 to enter text data and place telephone calls and a display screen 322 for communicating information to the user. A connect/send key 609 is preferably provided to aid in the placement of a phone call. Additionally, a disconnect/end key 605 is provided. The send key 609 and end key 605 preferably are arranged in a row of keys including a navigation tool 328. Additionally, the row of keys including the navigation tool 328 preferably has a menu key 606 and an escape key 608. The menu key 606 is used to bring up a menu and the escape key 608 is used to return to the previous screen or previous menu selection. As may be further appreciated from FIG. 1, the device 300 is of unibody construction, but it is also contemplated that the device may be of an alternative construction such as that commonly known as "clamshell" or "flip-phone" style. Regardless, in the operable configuration for the device 300, auxiliary user input 328 is located essentially between the display screen 322 and the keyboard 332. In the illustrated embodiment, the auxiliary user input is a trackball 121. Motion of the trackball 121 can be assessed using a plurality of sensors that quantify rotational motion of the trackball 121 about axes intersecting with the trackball. Trackball 121 can also be configured to be depressable for purposes of selecting a function that is highlighted with a highlighting cursor. Also, it should be appreciated by those having skill in the art that other auxiliary user input devices can be used in the place of the trackball, e.g., touchpads, joysticks and the like and that, as shown in FIGS. 12a-c, handheld device 300 can further comprise additional auxiliary inputs 350, 351 for purposes of navigating highlighting cursor about the screen and/or for selecting highlighted functions.

Figure 4:
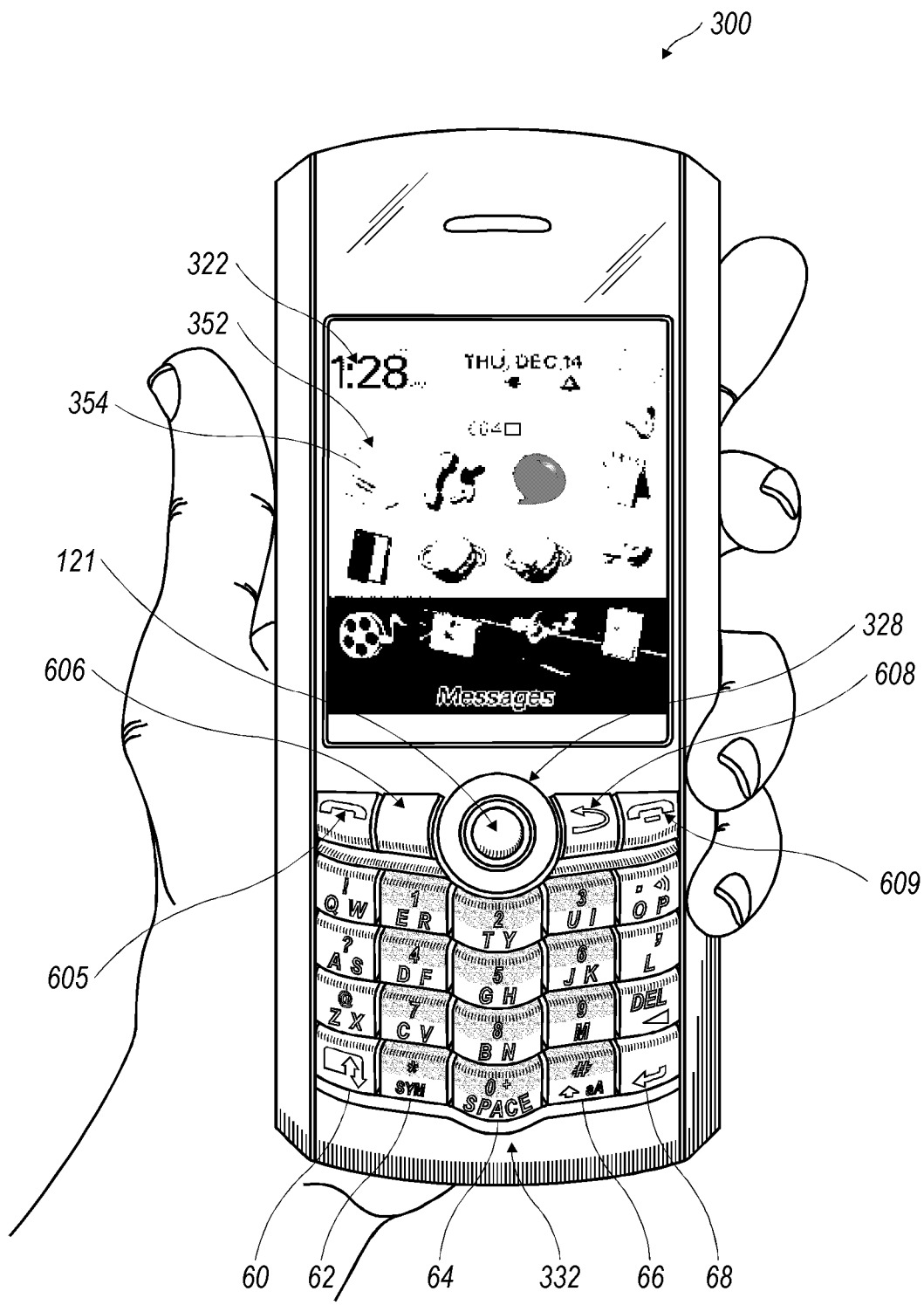
FIG. 4 depicts a novel handheld communication device cradled in a user's hand and displaying an array of icons on a screen thereof, wherein a "Messages" icon is shown as being highlighted.
Figure 5:
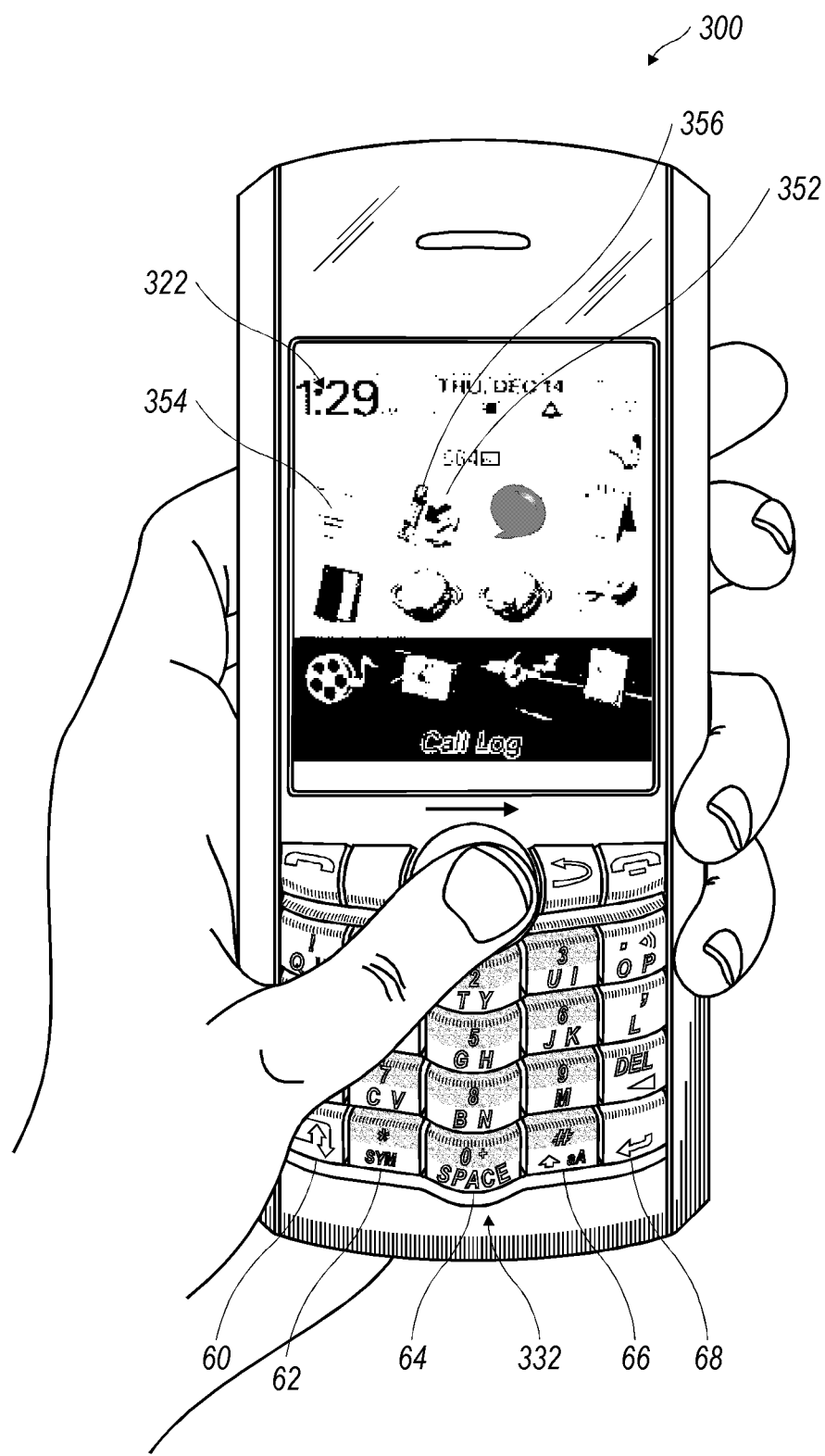
FIG. 5 depicts a novel handheld communication device cradled in a user's hand and displaying an array of icons on a screen thereof, wherein a "Call Log" icon is shown as being highlighted.
Figure 6:
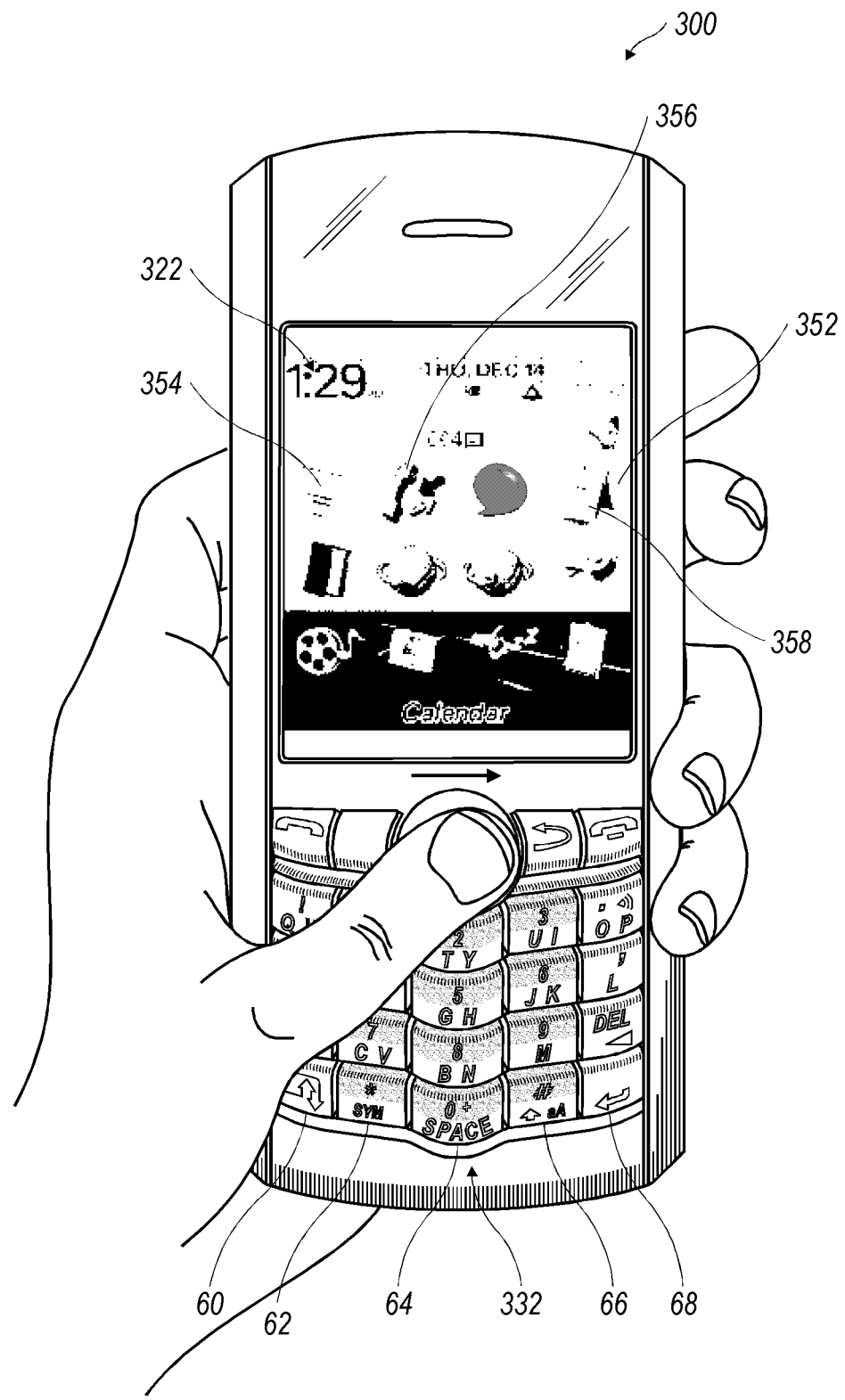
FIG. 6 depicts a novel handheld communication device cradled in a user's hand and displaying an array of icons on a screen thereof, wherein a "Calendar" icon is shown as being highlighted.
Figure 7:
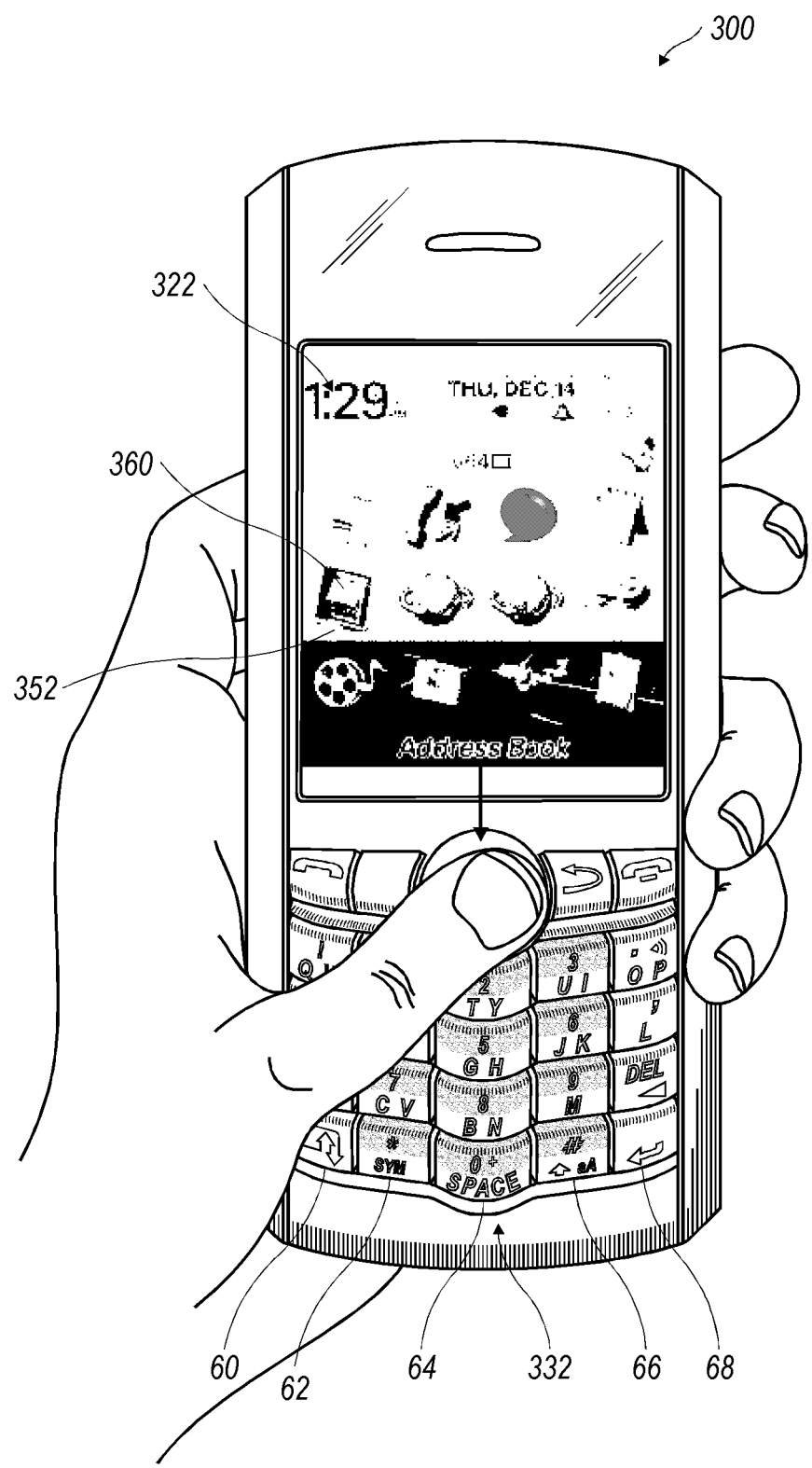
FIG. 7 depicts a novel handheld communication device cradled in a user's hand and displaying an array of icons on a screen thereof, wherein a "Address Book" icon is shown as being highlighted.
Figure 8:
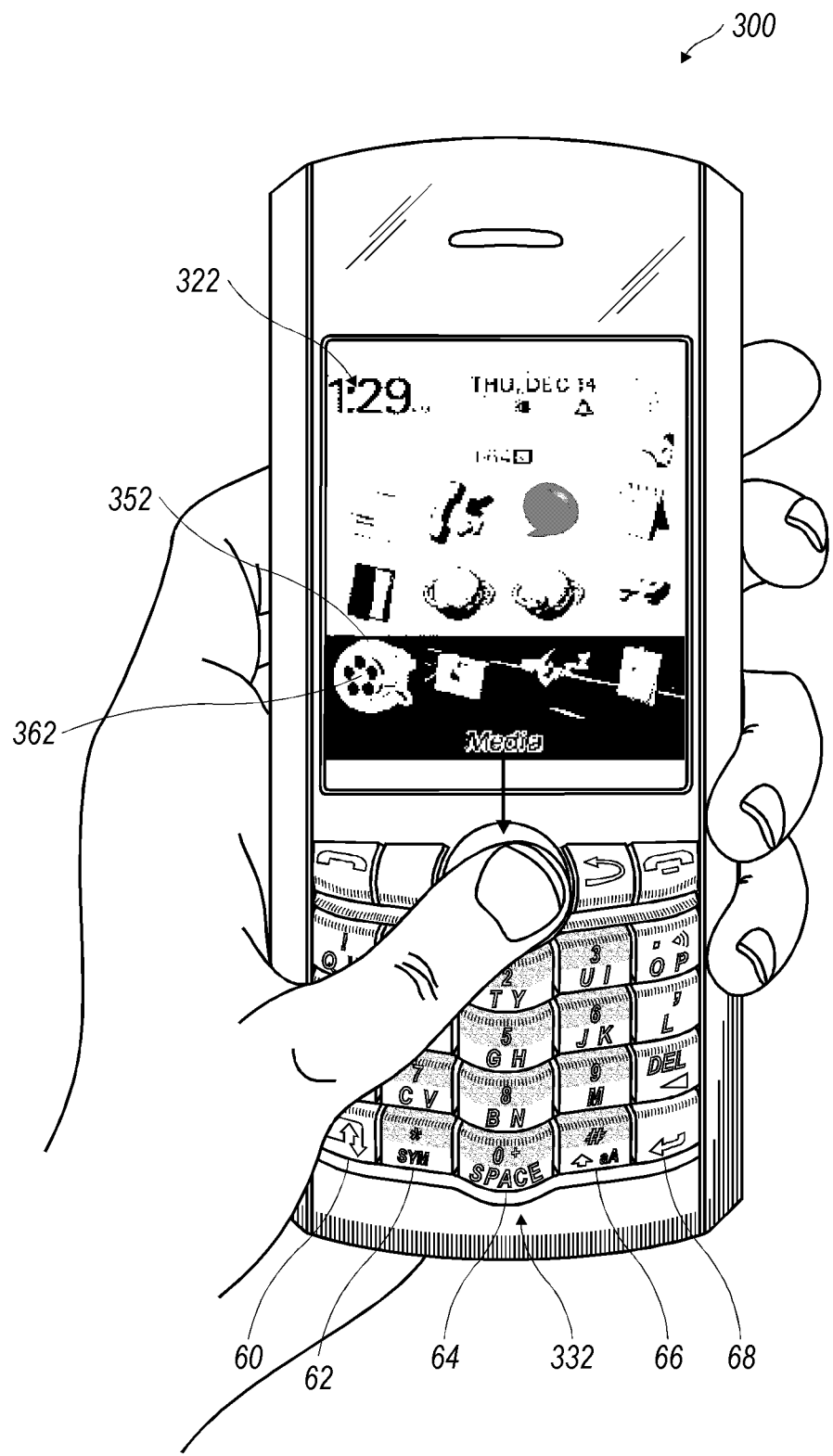
FIG. 8 depicts a novel handheld communication device cradled in a user's hand and displaying an array of icons on a screen thereof, wherein an "Media" icon is shown as being highlighted.
Figure 9:
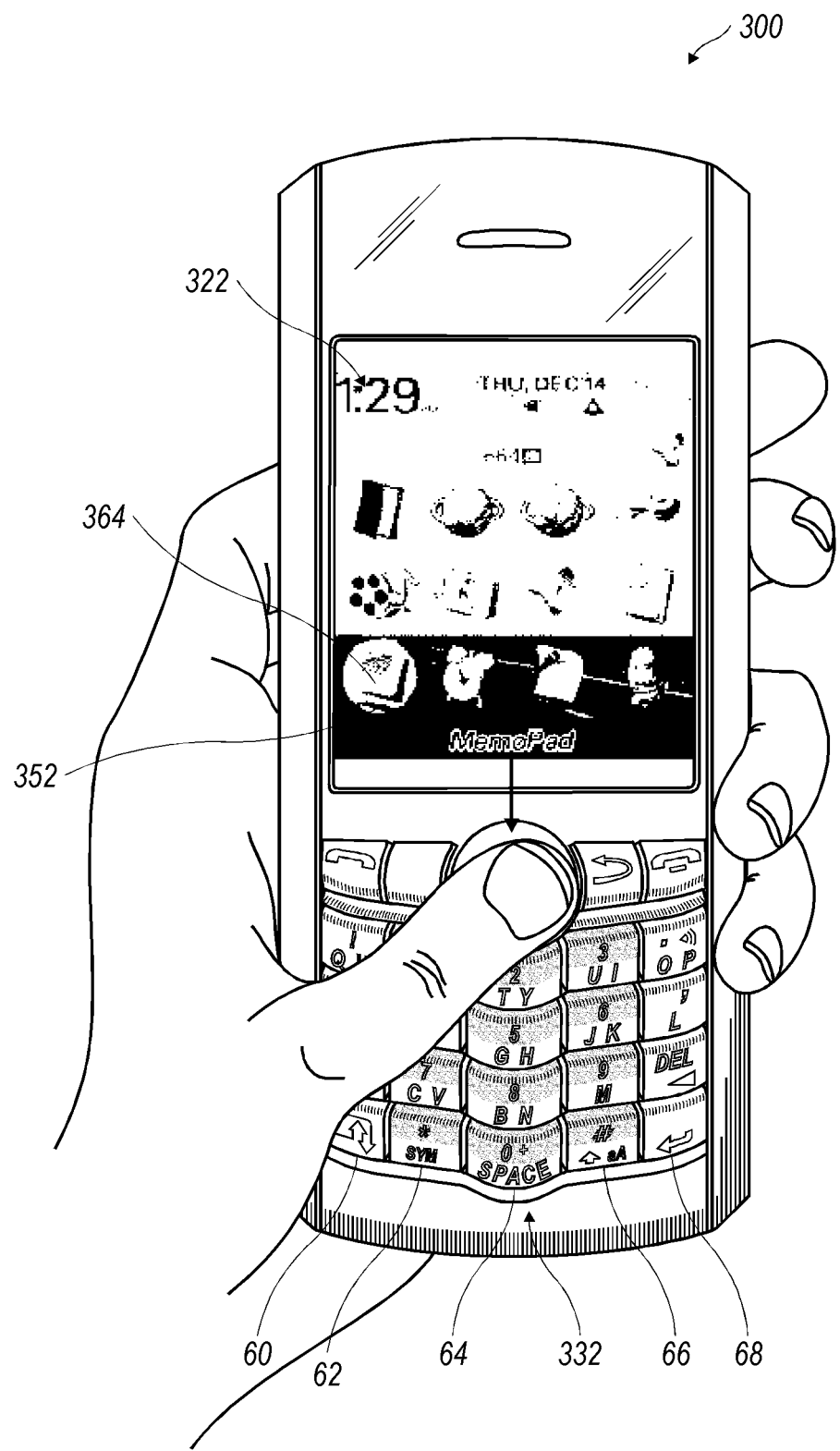
FIG. 9 depicts a novel handheld communication device cradled in a user's hand and displaying an array of icons on a screen thereof, wherein a "Memo Pad" icon is shown as being highlighted.
Figure 10:
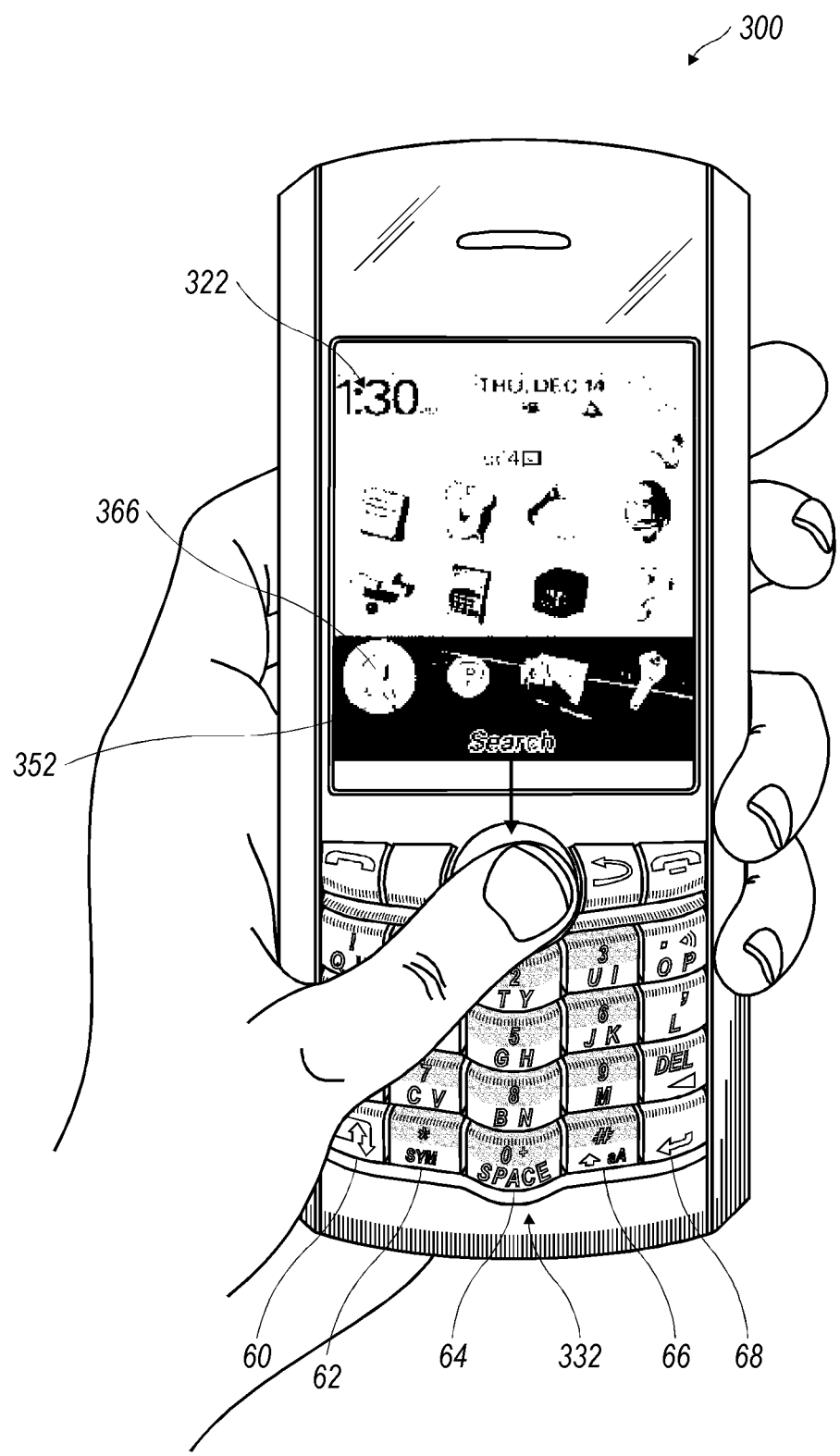
FIG. 10 depicts a novel handheld communication device cradled in a user's hand and displaying an array of icons on a screen thereof, wherein a "Search" icon is shown as being highlighted.
Figure 11:
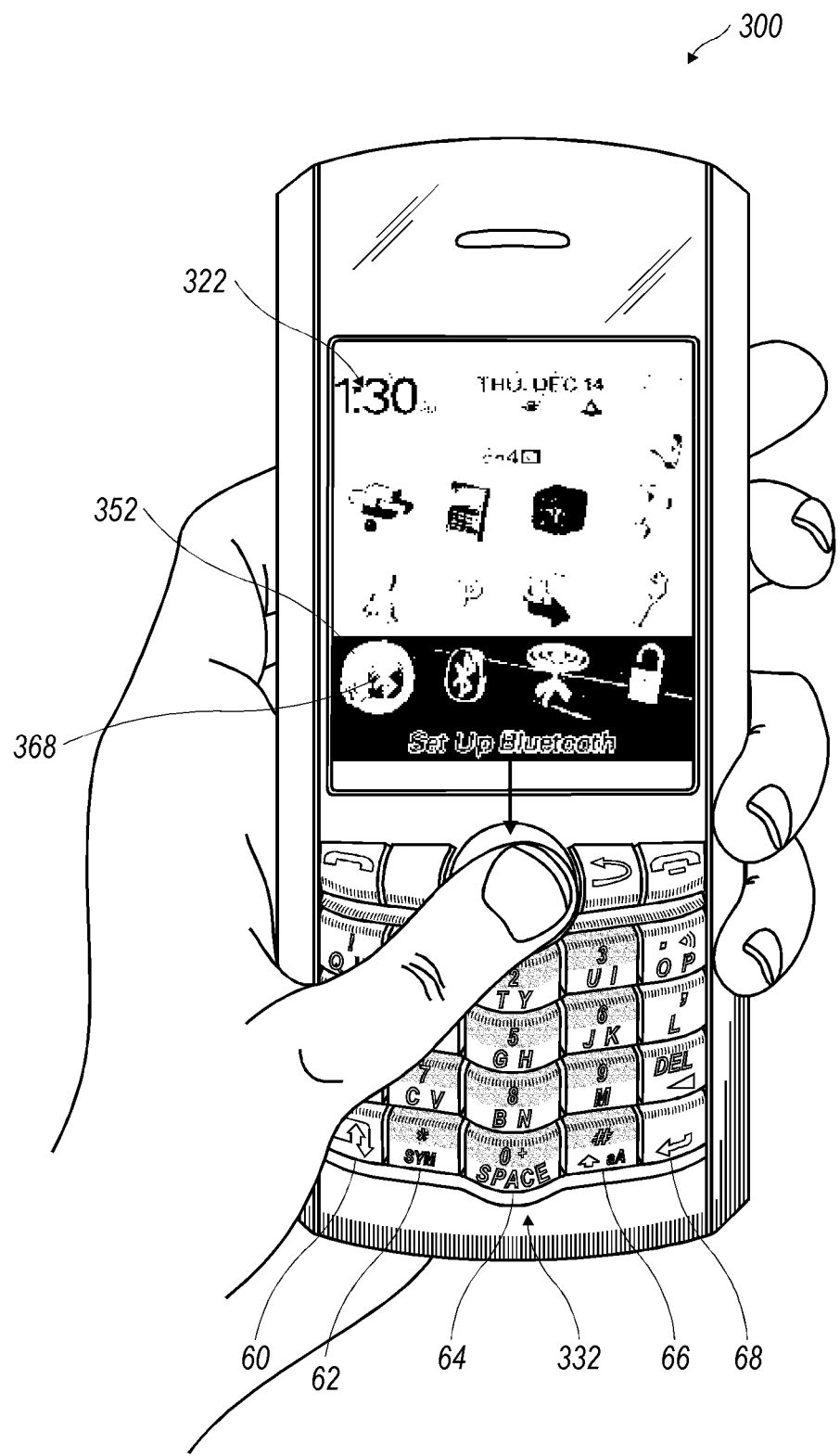
FIG. 11 depicts a novel handheld communication device cradled in a user's hand and displaying an array of icons on a screen thereof, wherein a "Set Up Bluetooth" icon is shown as being highlighted.

Referring now to FIGS. 4-12b, trackball 121 is provided for navigating highlighting cursor 352 amongst the icons of the screen display 322. As shown in FIGS. 4 and 5, from the position of highlighting cursor 253 of FIG. 4, rotation of the trackball 121 toward the right side of the device in the direction of the arrow, causes the highlighting cursor 352 to move from icon 354, labeled "Messages", to icon 356, labeled "Call Log". As shown in FIG. 6, continued rotation of the trackball in such direction causes the highlighting cursor to sequentially pass through the icons of that row until it reaches a terminal icon thereof, which, as shown in FIG. 6, is icon 358, labeled "Calendar." Because the trackball 121 has been "pinned" to the sides of the display screen, continued rotation of the trackball toward the right side of the device does not result in the highlighting cursor 352 passing to a successive neighboring row of icons immediately below, as would normally occur in a device such as that of FIGS. 2 and 3.

In order to accomplish navigation of the highlighted cursor between rows and along a column, the trackball can be rotated in an upward or downward direction toward the top and bottom of the device, i.e., toward the display screen and keyboard, respectively. As more clearly shown in FIGS. 4 and 7-11, when the trackball 121 is rotated in a downward direction from icon 354, "Messages", the highlighting cursor successively passes along the leftward column to icon 360, labeled "Address book," to icon 362, labeled "Media," to icon 364, labeled "MemoPad," to icon 366, labeled "Search," and finally, to the columns' lower terminal icon 368, labeled "Set up Bluetooth." Further assertion of a downward directed force does not result in the highlighting cursor passing to the top of a neighboring column.

Accordingly, because wrapping of the highlighting cursor 253 is prevented when navigating between both rows and columns, it is possible to dispose commonly utilized icons in convenient locales about the display screen of the device. For example, commonly used icons, such as "Messages," Calendar," "Set up Bluetooth," and "Lock/Unlock," can be arranged in the corners of the display screen amongst the plurality of icons. A user can simply navigate to such commonly used icons, often without the need to look at the device, by simply rotating the trackball in a requisite direction to arrive at such icons, which direction will typically be diagonal. The icons most commonly used and their disposition about the display screen either be pre-defined by the manufacturer or defined by the user. In an embodiment, sensors can be used to ascertain whether navigation toward a commonly used icon is desired; such sensors can be configured for measuring increased trackball parameters, such as rotational force applied upon the trackball 121 or acceleration thereof, which increased trackball parameters are represented by the bold arrows of FIGS. 12b and 12d.

Figure 12C:
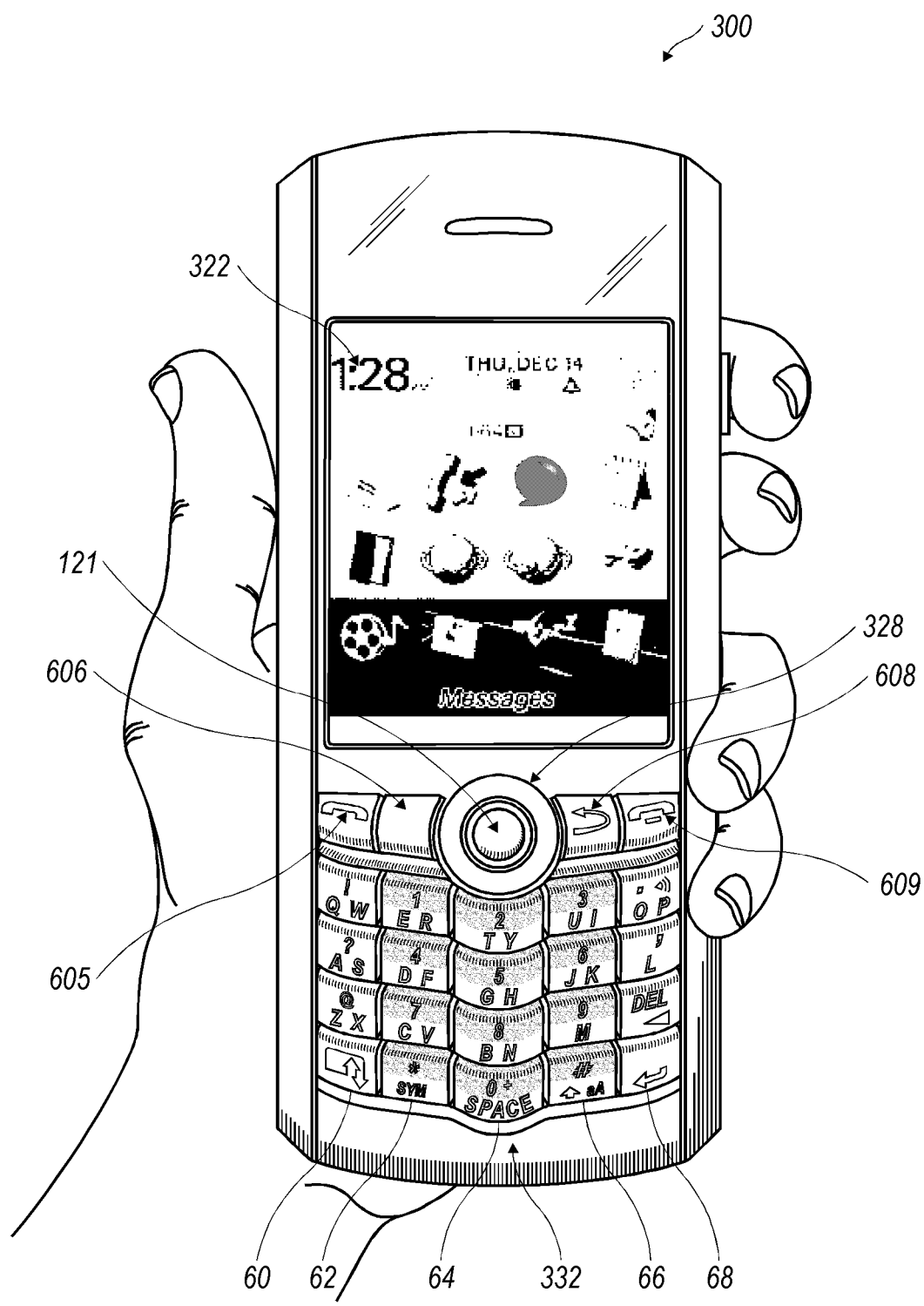
FIG. 12c depicts a novel handheld communication device cradled in a user's hand and displaying an array of icons on a screen thereof, wherein a "Messages" icon is shown as being highlighted.
Figure 12D:
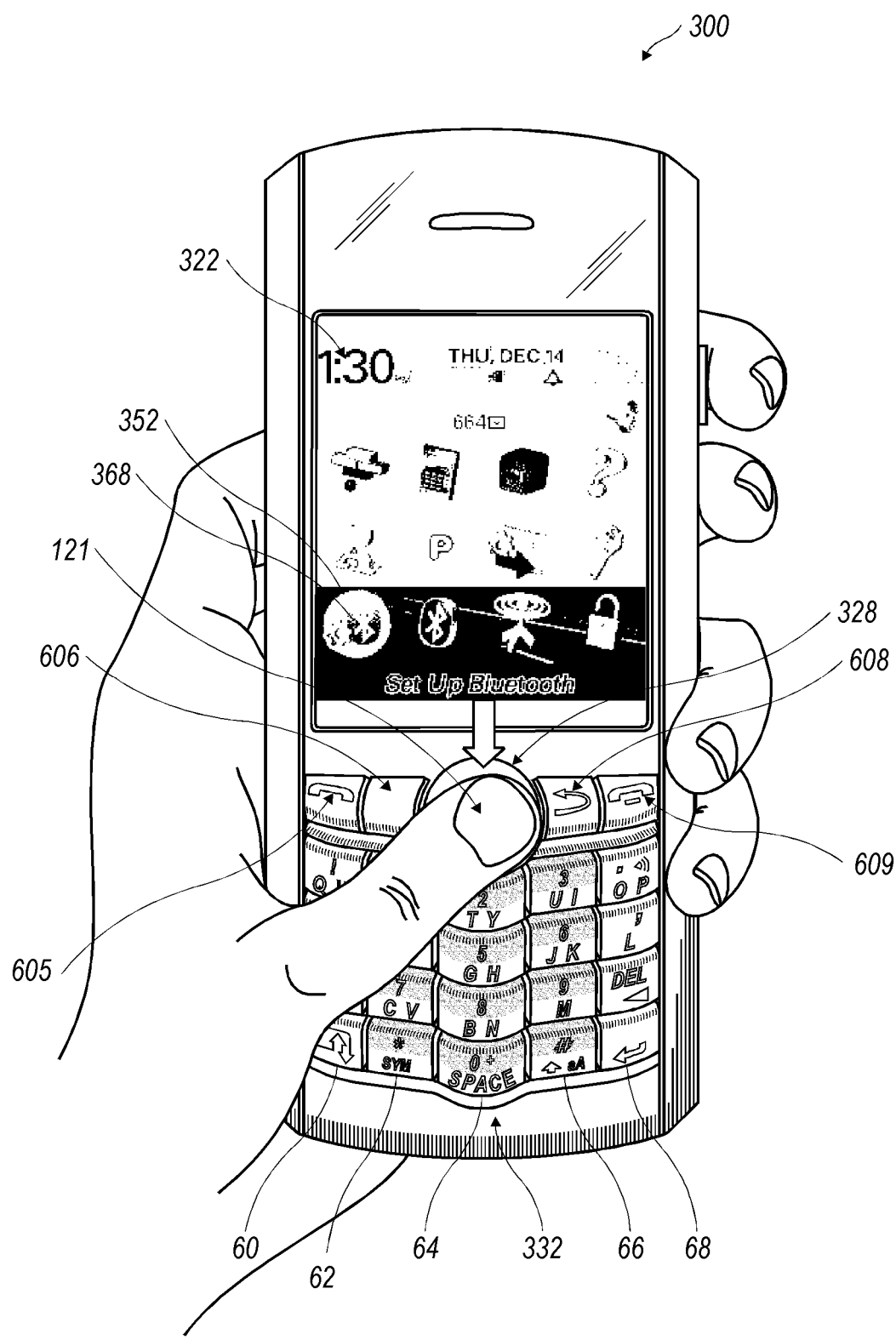
FIG. 12d depicts a novel handheld communication device cradled in a user's hand and displaying an array of icons on a screen thereof, wherein a "Set up Bluetooth" icon is shown as being highlighted.

Also, device 300 can be configured such that the highlighting cursor can "skip" intermediately disposed icons and navigate substantially directly to icons disposed at the ends of the rows and columns. As shown in FIGS. 12a and 12b, the highlighting cursor can be navigated substantially directly from icon 354, labeled "Messages," to icon 358 labeled "Calendar" by quickly rotating the trackball 121 in a rightward direction, or by depressing additional auxiliary user input 350, which can comprise a button disposed on the right side of the handheld device. Similarly, as shown in FIGS. 12c and 12d, the highlighting cursor can be navigated directly from icon 354, labeled "Messages," to icon 368, labeled "Set Up Bluetooth" by quickly rotating the trackball in a downward direction, or by depressing additional auxiliary user input 370, which can comprise a button disposed near the bottom of the keyboard, or the "B" button to represent the term "bottom." As may be appreciated navigation to leftward or upward terminal icons can be accomplished by quickly rotating the trackball in the requisite direction or by depressing an additional auxiliary input 351 disposed on the left side of the device 300 in the case of navigating leftward or a button located near the top of the keyboard, or the "T" button 372 representing "top," to navigate to an upwardly disposed terminal icon.

Further aspects of the environments, devices and methods of employment described hereinabove are expanded upon in the following details. An exemplary embodiment of the handheld electronic device 300 as shown in FIG. 1 is cradleable in the palm of a user's hand. The size of the device is such that a user is capable of operating the device 300 using the same hand that is holding the device 300. In a preferred embodiment, the user is capable of actuating all features of the device 300 using the thumb of the cradling hand; however, in other embodiments features may require the use of more than just the thumb of the cradling hand. The preferred embodiment of the handheld device 300 features a keyboard on the face of the device 300, which is actuable by the thumb of the hand cradling the device 300. The user may also hold the device 300 in such a manner to enable two thumb typing on the device 300.

The handheld electronic device 300 includes an input portion and an output display portion. The output display portion can be a display screen 322, such as an LCD or other similar display device.

The input portion includes a plurality of keys that can be of a physical nature such as actuable buttons or they can be of a software nature, typically constituted by virtual representations of physical keys on a display screen (referred to herein as "software keys"). It is also contemplated that the user input can be provided as a combination of the two types of keys. Each key of the plurality of keys has at least one actuable action which can be the input of a character, a command or a function. In this context, "characters" are contemplated to exemplarily include alphabetic letters, language symbols, numbers, punctuation, insignias, icons, pictures, and even a blank space. Input commands and functions can include such things as delete, backspace, moving a cursor up, down, left or right, initiating an arithmetic function or command, initiating a command or function specific to an application program or feature in use, initiating a command or function programmed by the user and other such commands and functions that are well known to those persons skilled in the art. Specific keys or other types of input devices can be used to navigate through the various applications and features thereof. Further, depending on the application or feature in use, specific keys can be enabled or disabled.

In the case of physical keys, all or a portion of the plurality of keys have one or more indicia, representing character(s), command(s), and/or functions(s), displayed at their top surface and/or on the surface of the area adjacent the respective key. In the instance where the indicia of a key's function is provided adjacent the key, the indicia can be printed on the device cover beside the key, or in the instance of keys located adjacent the display screen 322. Additionally, current indicia for the key may be temporarily shown nearby the key on the screen 322.

In the case of software keys, the indicia for the respective keys are shown on the display screen 322, which in one embodiment is enabled by touching the display screen 322, for example, with a stylus to generate the character or activate the indicated command or function. Some examples of display screens 322 capable of detecting a touch include resistive, capacitive, projected capacitive, infrared and surface acoustic wave (SAW) touchscreens.

Physical and software keys can be combined in many different ways as appreciated by those skilled in the art. In one embodiment, physical and software keys are combined such that the plurality of enabled keys for a particular application or feature of the handheld electronic device 300 is shown on the display screen 322 in the same configuration as the physical keys. Using this configuration, the user can select the appropriate physical key corresponding to what is shown on the display screen 322. Thus, the desired character, command or function is obtained by depressing the physical key corresponding to the character, command or function displayed at a corresponding position on the display screen 322, rather than touching the display screen 322.

Figure 14:
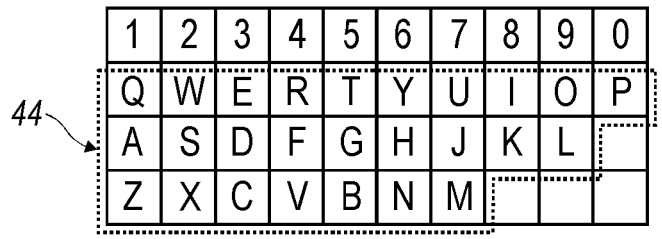
FIG. 14 illustrates an exemplary QWERTY keyboard layout.
Figure 15:
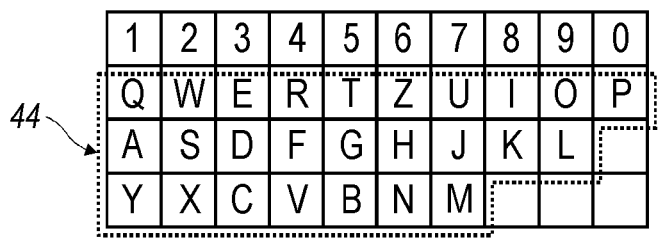
FIG. 15 illustrates an exemplary QWERTZ keyboard layout.
Figure 16:
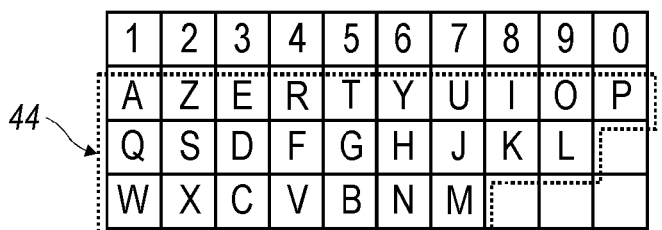
FIG. 16 illustrates an exemplary AZERTY keyboard layout.

The various characters, commands and functions associated with keyboard typing in general are traditionally arranged using various conventions. The most common of these in the United States, for instance, is the QWERTY keyboard layout. Others include the QWERTZ, AZERTY, and Dvorak keyboard configurations. The QWERTY keyboard layout is the standard English-language alphabetic key arrangement 44a shown in FIG. 14. The QWERTZ keyboard layout is normally used in German-speaking regions; this alphabetic key arrangement 44b is shown in FIG. 15. The AZERTY keyboard layout 44c is normally used in French-speaking regions and is shown in FIG. 16. The Dvorak keyboard layout was designed to allow typists to type faster; this alphabetic key arrangement 44d is shown in FIG. 17.

Alphabetic key arrangements are often presented along with numeric key arrangements. Typically, the numbers 1-9 and 0 are positioned in the row above the alphabetic keys 44, as shown in FIGS. 14-17. Alternatively, the numbers share keys with the alphabetic characters, such as the top row of the QWERTY keyboard (see FIG. 21 for an example). Yet another exemplary numeric key arrangement is shown in FIG. 18, where a "ten-key" style numeric keypad 46 is provided on a separate set of keys that is spaced from the alphabetic/numeric key arrangement 44. The ten-key styled numeric keypad 46 includes the numbers "7", "8", "9" arranged in a top row, "4", "5", "6" arranged in a second row, "1", "2", "3" arranged in a third row, and "0" in a bottom row. Further, a numeric phone key arrangement 42 is exemplarily illustrated in FIG. 19.

Figures 17, 18, 19, 20:
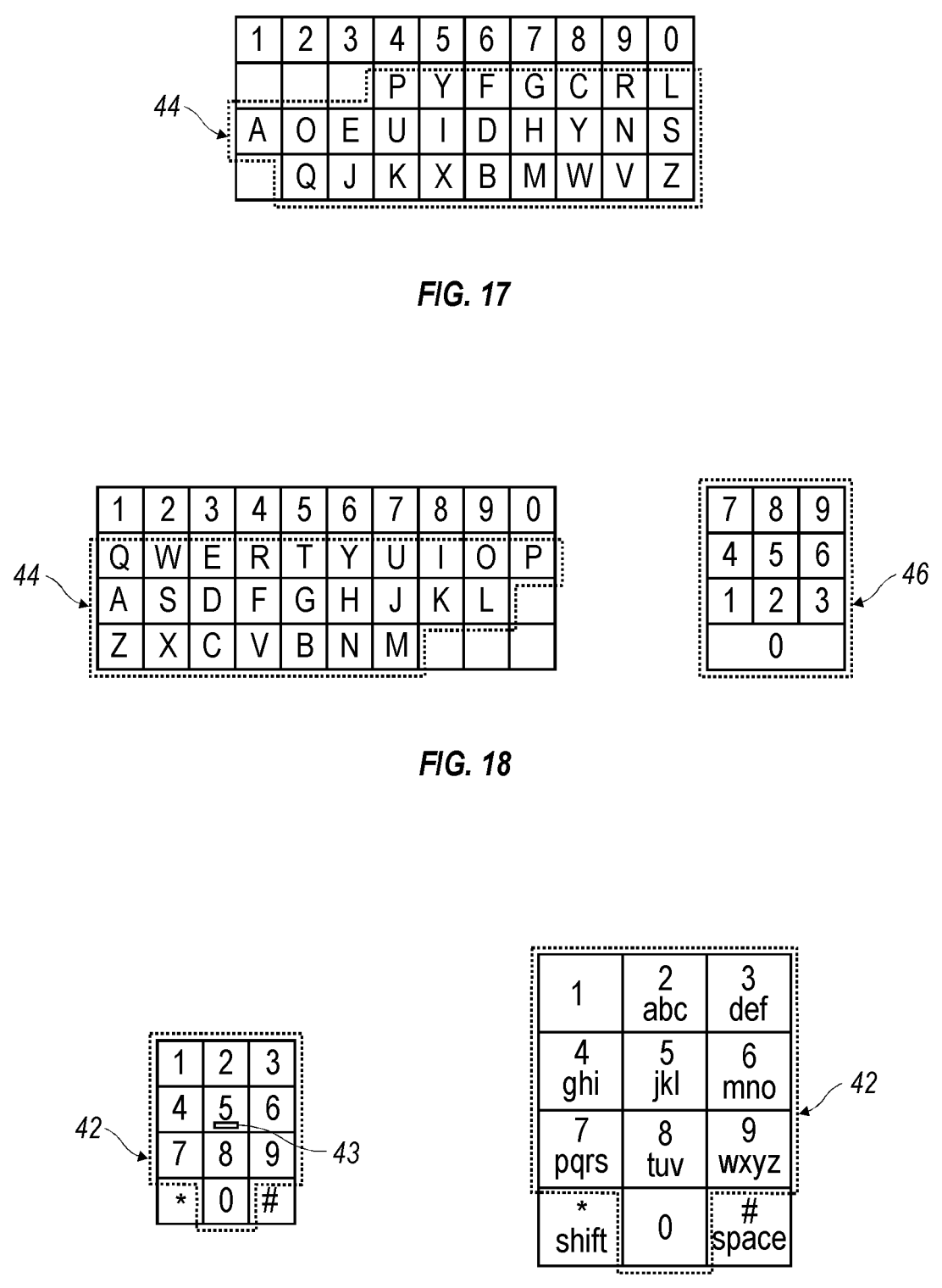

As shown in FIG. 19, the numeric phone key arrangement 42 may also utilize a surface treatment on the surface of the center "5" key. This surface treatment is configured such that the top surface of the key is distinctive from the surface of other keys. Preferably the surface treatment is in the form of a raised bump or recessed dimple 43. Alternatively, raised bumps may be positioned on the housing around the "5" key and do not necessarily have to be positioned directly on the key.

It is desirable for handheld electronic devices 300 to include a combined text-entry keyboard and a telephony keyboard. Examples of such mobile communication devices 300 include mobile stations, cellular telephones, wireless personal digital assistants (PDAs), two-way paging devices, and others. Various keyboards are used with such devices and can be termed a full keyboard, a reduced keyboard, or phone key pad.

In embodiments of a handheld electronic device 300 having a full keyboard, the alphabetic characters are singly associated with the plurality of physical keys. Thus, in an English-language keyboard of this configuration, there are at least 26 keys in the plurality so that there is at least one key for each letter.

Figure 21:
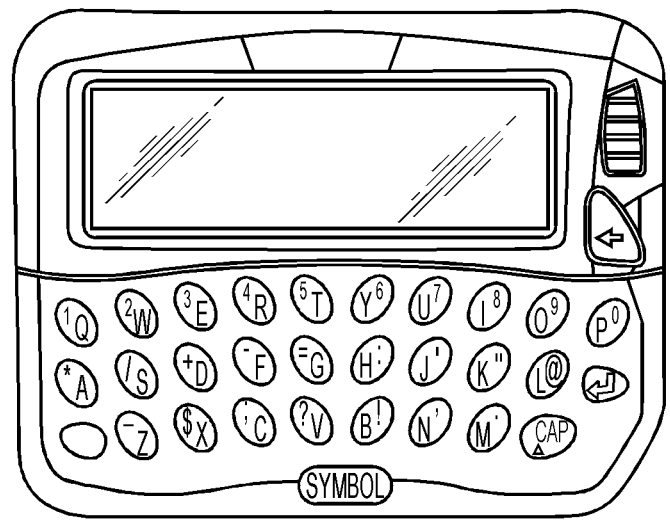
FIG. 21 is a front view of an exemplary handheld electronic device including a full QWERTY keyboard.
Figure 22:
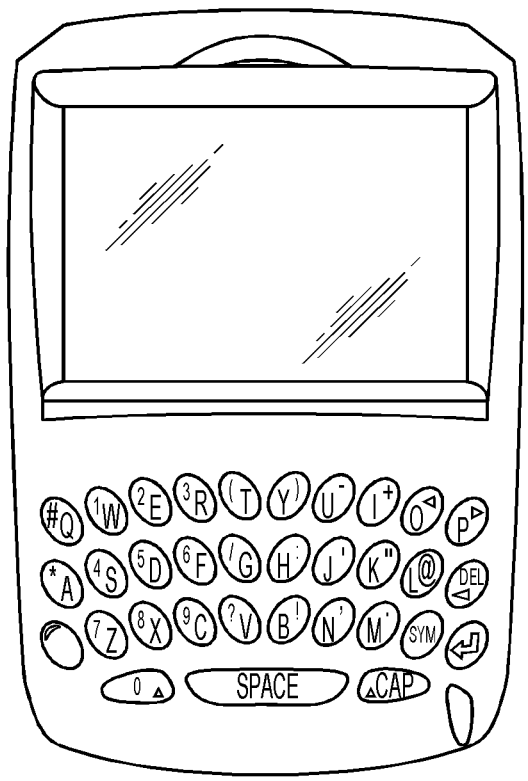
FIG. 22 is a front view of another exemplary handheld electronic device including a full QWERTY keyboard.

Devices 300 incorporating full keyboards for the alphabetic characters are shown in FIGS. 21 and 22. While both devices feature numeric keys, the device shown in FIG. 21 incorporates the numeric keys in a single row, whereas the device of FIG. 22 features numeric keys arranged according to the ITU Standard E.161 as shown in FIG. 19. The latter numeric arrangement can be described as an overlaid numeric phone keypad arrangement.

As intimated above, in order to further reduce the size of a handheld electronic device 300 without making the physical keys or software keys too small, some handheld electronic devices 300 use a reduced keyboard, where more than one character/command/function is associated with each of at least a portion of the plurality of keys. This results in certain keys being ambiguous since more than one character is represented by or associated with the key, even though only one of those characters is typically intended by the user when activating the key.

Thus, certain software usually runs on the processor of these types of handheld electronic device 300 to determine or predict what letter or word has been intended by the user. Some examples of software include predictive text routines which typically include a disambiguation engine and/or predictive editor application. The software preferably also has the ability to recognize character letter sequences that are common to the particular language, such as, in the case of English, words ending in "ming." Such systems can also "learn" the typing style of the user making note of frequently used words to increase the predictive aspect of the software. Other types of predictive text computer programs may be utilized with the reduced keyboard arrangements described herein, without limitation. Some specific examples include the multi-tap method of character selection and "text on nine keys".

The keys of reduced keyboards are laid out with various arrangements of characters, commands and functions associated therewith. In regards to alphabetic characters, the different keyboard layouts identified above are selectively used based on a user's preference and familiarity; for example, the QWERTY keyboard layout is most often used by English speakers who have become accustomed to the key arrangement.

FIG. 1 shows a handheld electronic device 300 that carries an example of a reduced keyboard using the QWERTY keyboard layout on a physical keyboard array of twenty keys comprising five columns and four rows. Fourteen keys are used for alphabetic characters and ten keys are used for numbers. Nine of the ten numbers share a key with alphabetic characters. The "space" key and the number "0" share the same key, which is centered on the device and centered below the remainder of the numbers on the keyboard 332. While in other embodiments, the number "0" may be located on other keys.

Figure 24:
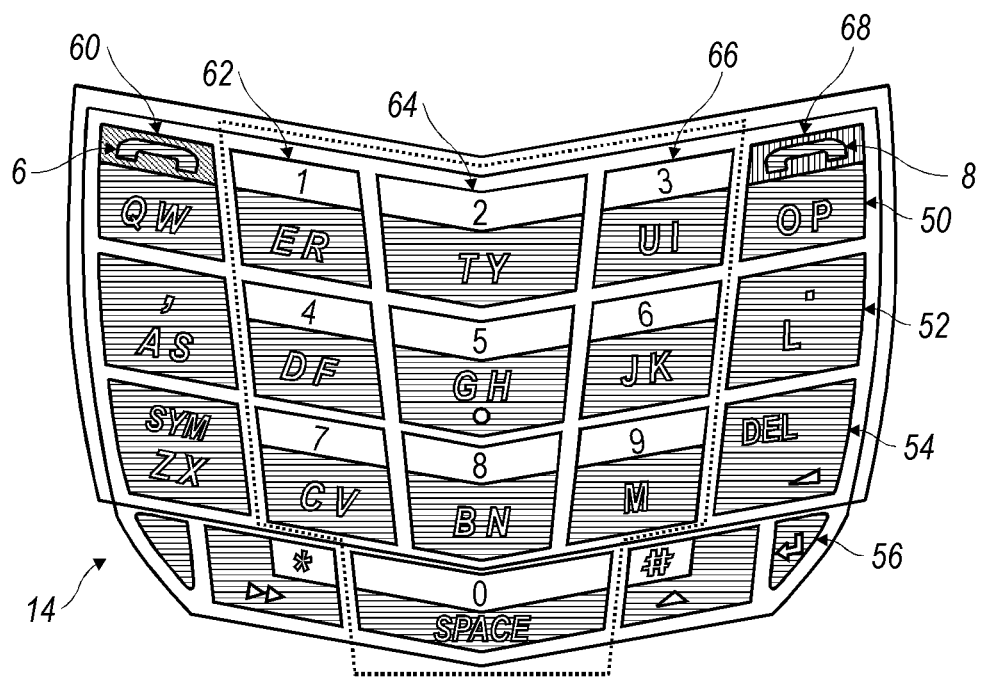
FIG. 24 is a closeup of a reduced QWERTY keyboard.

FIG. 24 shows an example physical keyboard array of 20 keys composed of five columns and four rows. Fourteen keys on the keyboard 332 are associated with alphabetic characters and ten keys are associated with numbers. Many of the keys have different sizes than the other keys, and the rows are non-linear. In particular, the keys in the middle column 64 are wider than keys in the outer columns 60, 62, 66 and 68. To readily identify the phone user interface (the second user interface), the numeric phone keys 0-9 include a color scheme that is different from that of the remaining keys associated with the QWERTY key arrangement.

In this example, a color scheme of the numeric phone keys has a two tone appearance, with the upper portion of the numeric keys being a first color and the lower portion of the numeric keys being a second color. The first color may be lighter than the second color, or darker than the second color. Furthermore, the send key 6 and end key 8 are located on keys with alphabetic indicia have a background color and/or color of the symbols that are different from the other keys of the keyboard 332.

Figure 23:
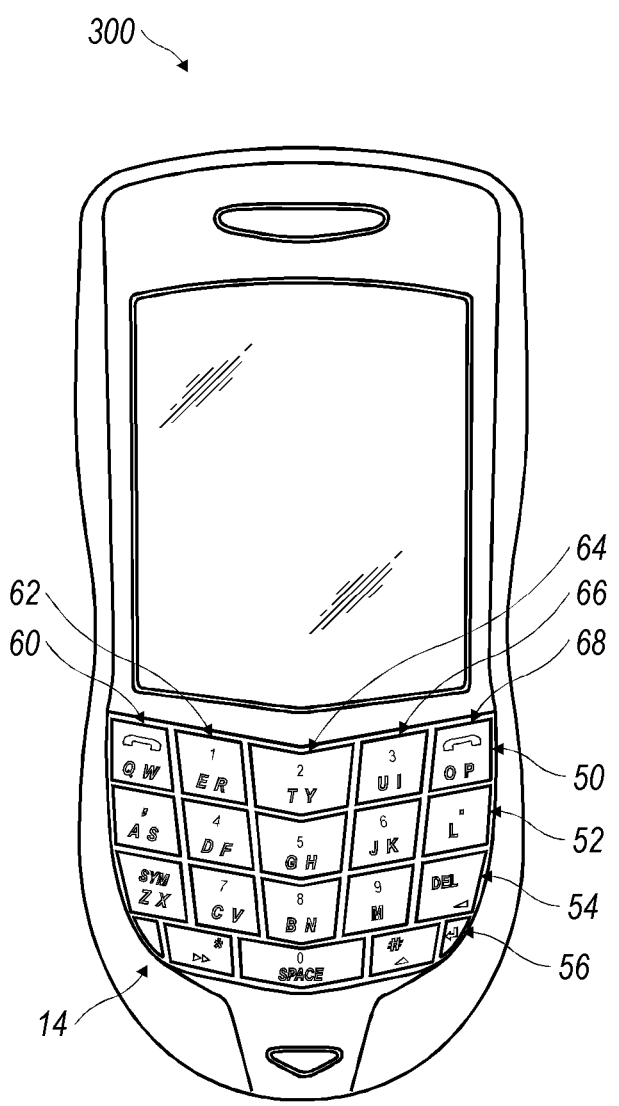
FIG. 23 is a front view of a handheld electronic device including a reduced QWERTY keyboard.
Figure 25:
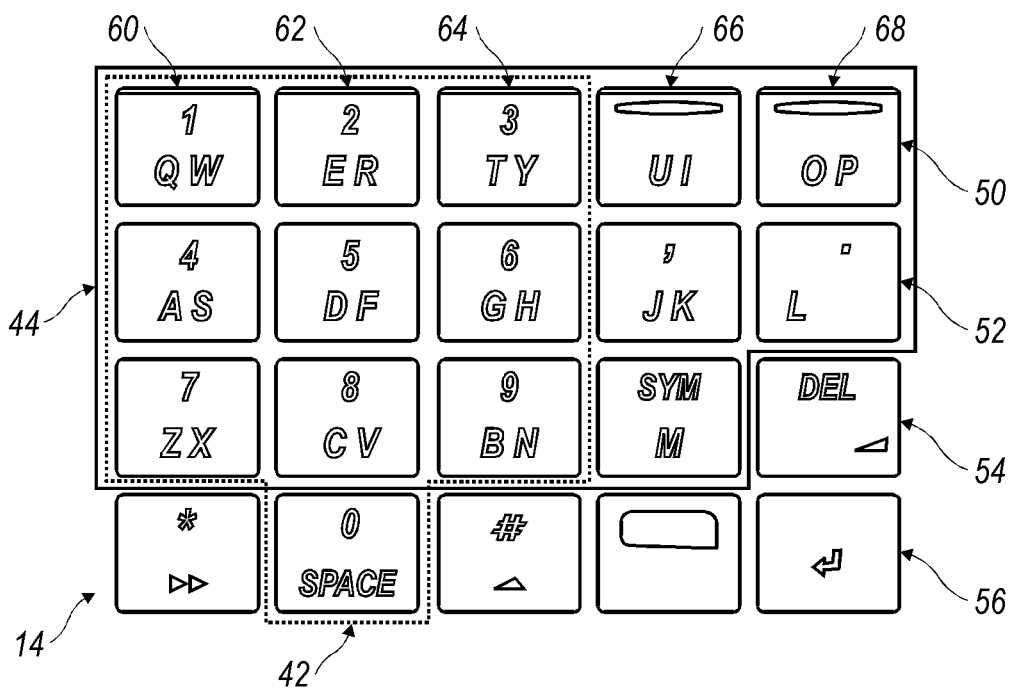
FIG. 25 is a detail view of an alternative reduced QWERTY keyboard.

FIG. 25 shows a similar format for the reduced QWERTY arrangement of alphabetic characters 44 as presented in FIG. 23, but the numeric phone key arrangement 42 is positioned in the first 60, second 62, and third 64 columns instead of being centered on the keyboard 332. Thus, no numerals are presented on keys in the fourth 66 and fifth 68 columns. The first row 50 of keys includes in order the following key combinations for the text entry and telephony mode: "QW/1", "ER/2", "TY/3", "UI", and "OP". The second row 52 includes the following key combinations in order: "AS/4", "DF/5", "GH/6", "JK/,", and "L/." The third row 54 includes the following key combinations in order: "ZX/7", "CV/8", "BN/9", "M/sym" and "backspace/delete". The fourth row 56 includes the following key combinations in order: "next/*", "space/0", "shift/#", "alt" and "return/enter". The keys in each of the rows are of uniform size and the rows and columns are straight.

Another embodiment of a reduced alphabetic keyboard is found on a standard phone keypad. Most handheld electronic devices having a phone key pad also typically include alphabetic key arrangements overlaying or coinciding with the numeric keys as shown in FIG. 20. Such alphanumeric phone keypads are used in many, if not most, traditional handheld telephony mobile communication devices such as cellular handsets.

As described above, the International Telecommunications Union ("ITU") has established phone standards for the arrangement of alphanumeric keys. The standard phone numeric key arrangement shown in FIGS. 19 (no alphabetic letters) and 20 (with alphabetic letters) corresponds to ITU Standard E.161, entitled "Arrangement of Digits, Letters, and Symbols on Telephones and Other Devices That Can Be Used for Gaining Access to a Telephone Network." This standard is also known as ANSI TI.703-1995/1999 and ISO/IEC 9995-8:1994. Regarding the numeric arrangement, it can be aptly described as a top-to-bottom ascending order three-by-three-over-zero pattern.

Figure 13:
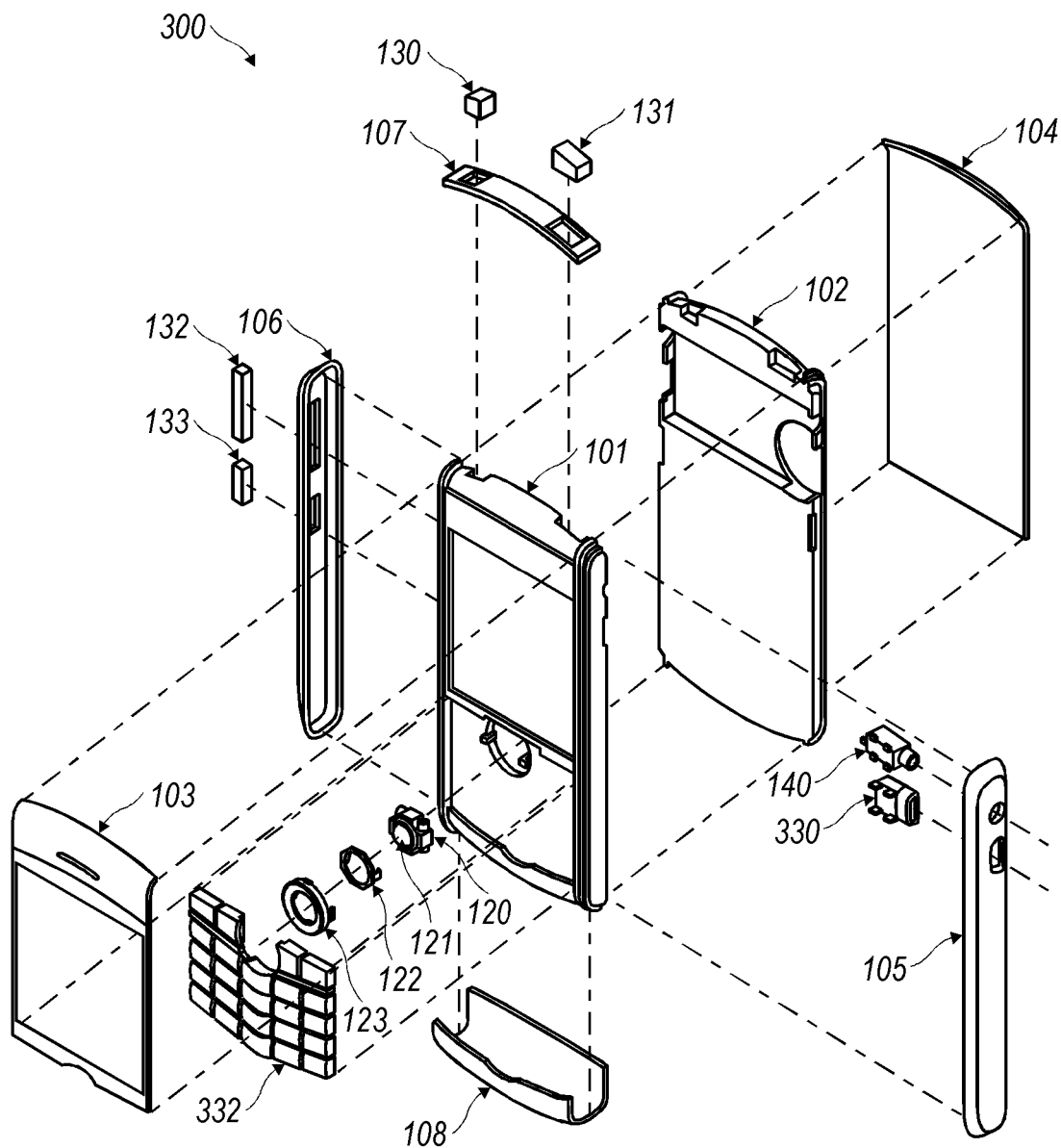
FIG. 13 is an exploded perspective view of an exemplary wireless handheld electronic device incorporating a trackball assembly as at the auxiliary user input.

FIG. 13 is an exploded view showing some of the typical components found in the assembly of the handheld electronic device. The construction of the device benefits from various manufacturing simplifications. The internal components are constructed on a single PCB (printed circuit board) 102. The keyboard 332 is constructed from a single piece of material, and in a preferred embodiment is made from plastic. The keyboard 332 sits over dome switches (not shown) located on the PCB 102 in a preferred embodiment. One switch is provided for every key on the keyboard in the preferred embodiment, but in other embodiments more than one switch or less than one switch per key are possible configurations. The support frame 101 holds the keyboard 332 and navigation tool 328 in place above the PCB 102. The support frame 101 also provides an attachment point for the display (not shown). A lens 103 covers the display to prevent damage. When assembled, the support frame 101 and the PCB 102 are fixably attached to each other and the display is positioned between the PCB 102 and support frame 101.

The navigation tool 328 is frictionally engaged with the support frame 101, but in a preferred embodiment the navigation tool 328 is removable when the device is assembled. This allows for replacement of the navigation tool 328 if/when it becomes damaged or the user desires replacement with a different type of navigation tool 328. In the exemplary embodiment of FIG. 3, the navigation tool 328 is a ball 121 based device. Other navigation tools 328 such as joysticks, four-way cursors, or touch pads are also considered to be within the scope of this disclosure. When the navigation tool 328 has a ball 121, the ball 121 itself can be removed without removal of the navigation tool 328. The removal of the ball 121 is enabled through the use of an outer removable ring 123 and an inner removable ring 122. These rings 122, 123 ensure that the navigation tool 328 and the ball 121 are properly held in place against the support frame 101.

A serial port (preferably a Universal Serial Bus port) 330 and an earphone jack 140 are fixably attached to the PCB 102 and further held in place by right side element 105. Buttons 130-133 are attached to switches (not shown), which are connected to the PCB 102.

Final assembly involves placing the top piece 107 and bottom piece 108 in contact with support frame 101. Furthermore, the assembly interconnects right side element 105 and left side element 106 with the support frame 101, PCB 102, and lens 103. These side elements 106, 105 provide additional protection and strength to the support structure of the device 300. In a preferred embodiment, backplate 104 is removably attached to the other elements of the device.

Figure 26:
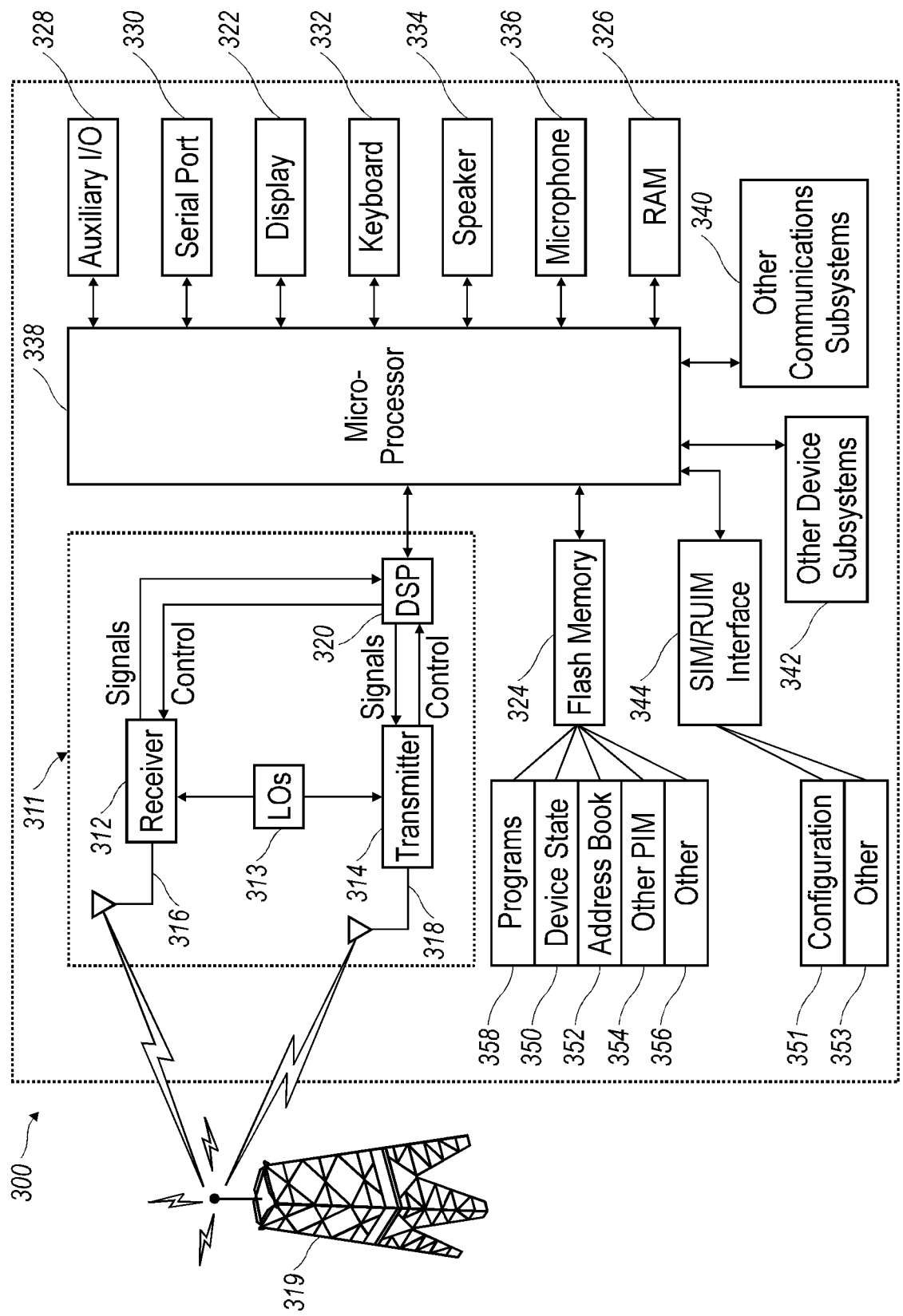
FIG. 26 is a block diagram representing a wireless handheld communication device interacting in a communication network.

An exemplary handheld electronic device 300 and its cooperation in a wireless network 319 is exemplified in the block diagram of FIG. 26. This figure is exemplary only, and those persons skilled in the art will appreciate the additional elements and modifications necessary to make the device 300 work in particular network environments.

The block diagram of FIG. 26 representing the communication device 300 interacting in the communication network 319 shows the device's 300 inclusion of a microprocessor 338 which controls the operation of the device 300. The communication subsystem 311 performs all communication transmission and reception with the wireless network 319. The microprocessor 338 further connects with an auxiliary input/output (I/O) subsystem 328, a serial port (preferably a Universal Serial Bus port) 330, a display 322, a keyboard 332, a speaker 334, a microphone 336, random access memory (RAM) 326, and flash memory 324. Other communication subsystems 340 and other device subsystems 342 are generally indicated as connected to the microprocessor 338 as well. An example of a communication subsystem 340 is that of a short range communication subsystem such as BLUETOOTH® communication module or an infrared device and associated circuits and components. Additionally, the microprocessor 338 is able to perform operating system functions and preferably enables execution of software applications on the communication device 300.

The above described auxiliary I/O subsystem 328 can take a variety of different subsystems including the above described navigation tool. The navigation tool is preferably a trackball based device, but it can be a thumbwheel, navigation pad, or joystick. These navigation tools are preferably located on the front surface of the device 300 but may be located on an exterior surface of the device 300. Other auxiliary I/O devices can include external display devices and externally connected keyboards (not shown). While the above examples have been provided in relation to the auxiliary I/O subsystem, other subsystems capable of providing input or receiving output from the handheld electronic device 300 are considered within the scope of this disclosure. Additionally, other keys may be placed along the side of the device 300 to function as escape keys, volume control keys, scrolling keys, power switches, or user programmable keys, which may be programmed accordingly.

In an exemplary embodiment, the flash memory 324 is enabled to provide a storage location for the operating system, device programs, and data. While the operating system in a preferred embodiment is stored in flash memory 324, the operating system in other embodiments is stored in read-only memory (ROM) or similar storage element (not shown). As those skilled in the art will appreciate, the operating system, device application or parts thereof may be loaded in RAM 326 or other volatile memory.

In a preferred embodiment, the flash memory 324 contains programs/applications 358 for execution on the device 300 including an address book 352, a personal information manager (PIM) 354, and the device state 350. Furthermore, programs 358 and other information 356 including data can be segregated upon storage in the flash memory 324 of the device 300.

When the device 300 is enabled for two-way communication within the wireless communication network 319, it can send and receive signals from a mobile communication service. Examples of communication systems enabled for two-way communication include, but are not limited to, the GPRS (General Packet Radio Service) network, the UMTS (Universal Mobile Telecommunication Service) network, the EDGE (Enhanced Data for Global Evolution) network, and the CDMA (Code Division Multiple Access) network and those networks generally described as packet-switched, narrowband, data-only technologies mainly used for short burst wireless data transfer. For the systems listed above, the communication device 300 must be properly enabled to transmit and receive signals from the communication network 319. Other systems may not require such identifying information. GPRS, UMTS, and EDGE require the use of a SIM (Subscriber Identity Module) in order to allow communication with the communication network 319. Likewise, most CDMA systems require the use of a RUIM (Removable Identity Module) in order to communicate with the CDMA network. The RUIM and SIM card can be used in multiple different communication devices 300. The communication device 300 may be able to operate some features without a SIM/RUIM card, but it will not be able to communicate with the network 319. A SIM/RUIM interface 344 located within the device allows for removal or insertion of a SIM/RUIM card (not shown). The SIM/RUIM card features memory and holds key configurations 351, and other information 353 such as identification and subscriber related information. With a properly enabled communication device 300, two-way communication between the communication device 300 and communication network 319 is possible.

If the communication device 300 is enabled as described above or the communication network 319 does not require such enablement, the two-way communication enabled device 300 is able to both transmit and receive information from the communication network 319. The transfer of communication can be from the device 300 or to the device 300. In order to communicate with the communication network 319, the device 300 in a preferred embodiment is equipped with an integral or internal antenna 318 for transmitting signals to the communication network 319. Likewise the communication device 300 in the preferred embodiment is equipped with another antenna 316 for receiving communication from the communication network 319. These antennae (316, 318) in another preferred embodiment are combined into a single antenna (not shown). As one skilled in the art would appreciate, the antenna or antennae (316, 318) in another embodiment are externally mounted on the device 300.

When equipped for two-way communication, the communication device 300 features a communication subsystem 311. As is well known in the art, this communication subsystem 311 is modified so that it can support the operational needs of the device 300. The subsystem 311 includes a transmitter 314 and receiver 312 including the associated antenna or antennae (316, 318) as described above, local oscillators (LOs) 313, and a processing module 320 which in a preferred embodiment is a digital signal processor (DSP) 320.

It is contemplated that communication by the device 300 with the wireless network 319 can be any type of communication that both the wireless network 319 and device 300 are enabled to transmit, receive and process. In general, these can be classified as voice and data. Voice communication is communication in which signals for audible sounds are transmitted by the device 300 through the communication network 319. Data is all other types of communication that the device 300 is capable of performing within the constraints of the wireless network 319.

Exemplary embodiments have been described hereinabove regarding both handheld electronic devices, as well as the communication networks within which they cooperate. It should be appreciated, however, that a focus of the present disclosure is the enablement of a user of such wireless handheld electronic devices to select and edit text or characters through a touch sensitive screen, which displays an original configuration and an expanded view as needed.

What is claimed is:

1. A handheld communication device capable of affecting movement of a highlighting cursor amongst an array of icons arranged in rows and columns on a display of the handheld communication device, the rows being oriented along a first dimension and the columns being oriented along a second dimension, said handheld communication device comprising:
   the display;
   an input device configured to:
      generate first input signals upon being manipulated in a first direction that corresponds to the first dimension; and
      generate second input signals upon being manipulated in a second direction that corresponds to the second dimension;
   a sensor that measures a manipulation rate of the input device, the manipulation rate being associated with at least one of the corresponding first direction and second direction; and
   a microprocessor communicatively coupled to the input device, the sensor, and the display, the microprocessor programmed to:
      receive the first input signals and the second input signals;
      receive the manipulation rate associated with at least one of the corresponding first direction and second direction;
      determine whether the manipulation rate exceeds a preselected threshold;
      generate first navigation signals when the manipulation rate exceeds the preselected threshold, the first navigation signals being configured to navigate the highlighting cursor substantially directly to a terminal icon within the array of icons;
      generate second navigation signals when the manipulation rate does not exceed the preselected threshold, the second navigation signals being configured to navigate the highlighting cursor sequentially through icons in one of the corresponding rows or columns, the corresponding rows and columns including terminal icons; and
      pin the highlighting cursor at one of the terminal icons when the microprocessor continues to receive at least one of the first navigation signals and the second navigation signals.

2. The handheld communication device as recited in claim 1, wherein the input device is a trackball.

3. The handheld communication device as recited in claim 1, wherein the microprocessor is programmed to generate the second navigation signals to navigate the highlighting cursor along a same row or a same column upon receiving the first input signals or the second input signals, respectively.

4. The handheld communication device as recited in claim 1, further comprising an auxiliary input device that instructs the microprocessor to navigate the highlighting cursor substantially directly to the terminal icon.

5. The handheld communication device as recited in claim 4, wherein the auxiliary input device is disposed along a side of said handheld communication device.

6. The handheld communication device as recited in claim 4, further comprising a keyboard, the auxiliary input device being disposed proximate to at least one of a top and a bottom of the keyboard.

7. The handheld communication device as recited in claim 1, wherein the microprocessor is programmed to generate the second navigation signals to navigate the highlighting cursor between rows or columns upon receiving the second input signals or the first input signals, respectively.

8. The handheld communication device as recited in claim 1, wherein the microprocessor is programmed to dispose a commonly utilized icon at a predetermined location about said display.

9. The handheld communication device as recited in claim 8, wherein the microprocessor disposes said commonly utilized icon at a corner location amongst said array of icons.

10. The handheld communication device as recited in claim 8, wherein the microprocessor disposes said commonly utilized icon along a side location amongst said array of icons.

11. The handheld communication device as recited in claim 8, wherein the input device generates an auxiliary signal that instructs the microprocessor to navigate the highlighting cursor to said commonly utilized icon.

12. The handheld communication device as recited in claim 9, wherein the microprocessor is responsive to a user selecting the predetermined location to dispose the commonly utilized icon.

13. The handheld communication device as recited in claim 1, wherein the manipulation rate includes information on at least one of an amount of force applied to the input device and an acceleration applied to the input device.

14. A method for affecting movement of a highlighting cursor on a display of a handheld communication device, the display having an array of icons arranged in rows and columns with the rows being oriented along a first dimension and the columns being oriented along a second dimension, said method comprising:
  receiving first input signals at a microprocessor, the first input signals being generated by an input device that is manipulated in a first direction corresponding to the first dimension;
  receiving second input signals at the microprocessor, the second input signals being generated by the input device that is manipulated in a second direction corresponding to the second dimension;
  measuring a manipulation rate of the input device, the manipulation rate being associated with at least one of the corresponding first direction and second direction;
  determining whether the manipulation rate exceeds a preselected threshold;
  generating first navigation signals when the manipulation rate exceeds the preselected threshold, the first navigation signals being configured to navigate the highlighting cursor substantially directly to a terminal icon within the array of icons;
  generating second navigation signals when the manipulation rate does not exceed the preselected threshold, the second navigation signals being configured to navigate the highlighting cursor sequentially through icons in one of the corresponding rows or columns, the corresponding rows and columns including terminal icons; and
  pinning the highlighting cursor at one of the terminal icons when the microprocessor continues to receive at least one of the first navigation signals and the second navigation signals.

15. The method of claim 14, wherein the first input signals and the second input signals are generated by a trackball.

16. The method of claim 14, further comprising:
  receiving the second navigation signals to navigate the highlighting cursor along a same row
  or a same column.

17. The method of claim 14, further comprising disposing a commonly utilized icon at a predetermined location on said display.

18. The method of claim 17, wherein disposing said commonly utilized icon includes positioning the commonly utilized icon at a corner location amongst said array of icons.

19. The method of claim 17, further comprising receiving an auxiliary signal to navigate said highlighting cursor to said commonly utilized icon.

20. The method of claim 17, further comprising receiving an auxiliary input signal to directly navigate said highlighting cursor to said predetermined location.

21. The method of claim 17, wherein disposing the commonly utilized icon at the predetermined location includes enabling a user to select the predetermined location.

22. The method of claim 14, wherein the manipulation rate includes information on at least one of an amount of force applied to the input device and an acceleration applied to the input device.

* * * * *